US012744336B2

(12) United States Patent
Albessard et al.

(10) Patent No.: US 12,744,336 B2
(45) Date of Patent: Sep. 22, 2026

(54) CONNECTION STRUCTURE OF SUPERCONDUCTING LAYER, SUPERCONDUCTING WIRE, SUPERCONDUCTING COIL, AND SUPERCONDUCTING DEVICE

(71) Applicant: KABUSHIKI KAISHA TOSHIBA, Tokyo (JP)

(72) Inventors: Keiko Albessard, Yokohama Kanagawa (JP); Tomoko Eguchi, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 218 days.

(21) Appl. No.: 18/789,794

(22) Filed: Jul. 31, 2024

(65) Prior Publication Data

US 2025/0174918 A1 May 29, 2025

(30) Foreign Application Priority Data

Nov. 28, 2023 (JP) ................................ 2023-200855

(51) Int. Cl.
*H01R 4/68* (2006.01)
*H01B 12/02* (2006.01)
*H01B 12/06* (2006.01)

(52) U.S. Cl.
CPC ............... *H01R 4/68* (2013.01); *H01B 12/02* (2013.01)

(58) Field of Classification Search
CPC .......... H01B 12/06; H01B 12/02; H01R 4/68; Y02E 40/60
See application file for complete search history.

(56) References Cited

U.S. PATENT DOCUMENTS

2022/0199887 A1 6/2022 Hagiwara et al.
2022/0302609 A1 9/2022 Hattori et al.
2023/0005644 A1* 1/2023 Nakai .................... H01B 12/02
2023/0030881 A1 2/2023 Hattori et al.
(Continued)

FOREIGN PATENT DOCUMENTS

JP 6178799 B2 8/2017
JP 2022-41667 A 3/2022
(Continued)

*Primary Examiner* — Timothy J Thompson
*Assistant Examiner* — Amol H Patel
(74) *Attorney, Agent, or Firm* — Finnegan, Henderson, Farabow, Garrett & Dunner, LLP

(57) ABSTRACT

A connection structure of a superconducting layer according to an embodiment includes: a first superconducting layer; a second superconducting layer; and a connection layer provided between the first superconducting layer and the second superconducting layer and including a crystal region containing a rare earth element (RE), barium (Ba), copper (Cu), and oxygen (O), and a void. In a cross section perpendicular to a surface of the first superconducting layer, the crystal region includes a path extending from the first superconducting layer to the second superconducting layer. The path includes a plurality of narrow portions, and a width of a minimum narrow portion having a minimum width among the narrow portions is equal to or more than 300 nm. In the cross section, an area ratio of the void is equal to or more than 30% and equal to or less than 70%.

15 Claims, 16 Drawing Sheets

(56) References Cited

U.S. PATENT DOCUMENTS

| | | | | |
|---|---|---|---|---|
| 2023/0085118 | A1 | 3/2023 | Hagiwara et al. | |
| 2023/0268099 | A1 | 8/2023 | Hattori et al. | |
| 2024/0107898 | A1 | 3/2024 | Eguchi et al. | |
| 2024/0188452 | A1* | 6/2024 | Ohki | H10N 60/124 |
| 2024/0333119 | A1* | 10/2024 | Hull | H02K 5/22 |
| 2025/0046495 | A1* | 2/2025 | Ohki | H01B 12/06 |
| 2025/0279640 | A1 | 9/2025 | Albessard et al. | |

FOREIGN PATENT DOCUMENTS

| | | | |
|---|---|---|---|
| JP | 2022-145041 | A | 10/2022 |
| JP | 2023-19936 | A | 2/2023 |
| JP | 2023-41996 | A | 3/2023 |
| JP | 2023-122795 | A | 9/2023 |
| JP | 2023-122796 | A | 9/2023 |
| JP | 2024-43659 | A | 4/2024 |
| JP | 2024-43984 | A | 4/2024 |
| JP | 2025-133360 | A | 9/2025 |
| WO | WO 2018/211699 | A1 | 11/2018 |

* cited by examiner

CONNECTION STRUCTURE OF SUPERCONDUCTING LAYER, SUPERCONDUCTING WIRE, SUPERCONDUCTING COIL, AND SUPERCONDUCTING DEVICE

CROSS-REFERENCE TO RELATED APPLICATION

This application is based upon and claims the benefit of priority from Japanese Patent Application No. 2023-200855, filed on Nov. 28, 2024, the entire contents of which are incorporated herein by reference.

FIELD

Embodiments described herein relate generally to a connection structure of a superconducting layer, a superconducting wire, a superconducting coil, and a superconducting device.

BACKGROUND

For example, in a nuclear magnetic resonance apparatus (NMR) or a magnetic resonance imaging apparatus (MRI), a superconducting coil is used to generate a strong magnetic field. The superconducting coil is formed by winding a superconducting wire around a winding frame.

In order to lengthen the superconducting wire, for example, a plurality of superconducting wires are connected. For example, ends of two superconducting wires are connected using a connection structure. The connection structure for connecting the superconducting wires is required to have low electrical resistance and high mechanical strength.

DETAILED DESCRIPTION

Figure 1:
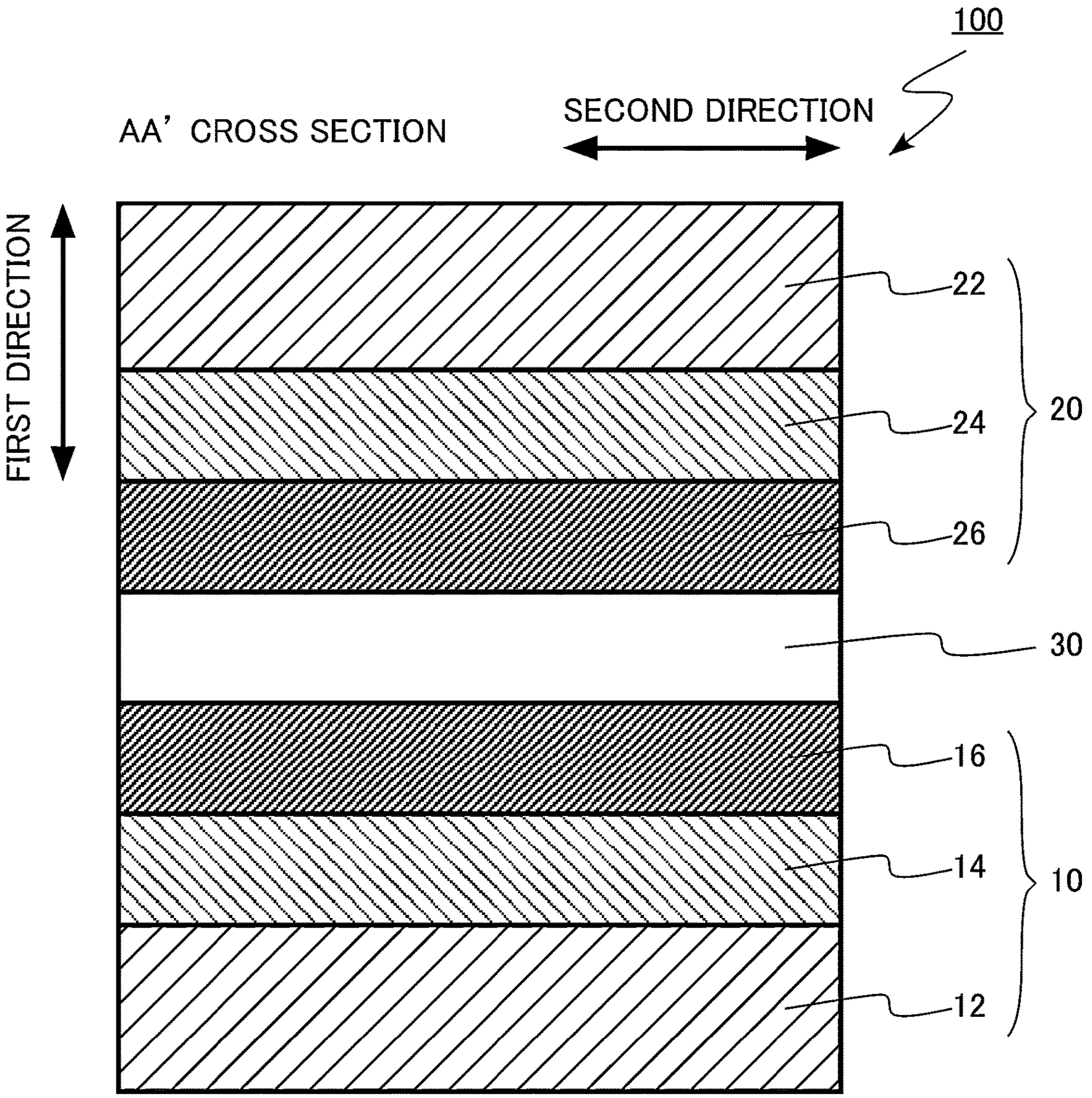
FIG. 1 is a schematic cross-sectional view of a connection structure of a superconducting layer according to a first embodiment.

A connection structure of a superconducting layer according to an embodiment includes: a first superconducting layer; a second superconducting layer; and a connection layer provided between the first superconducting layer and the second superconducting layer and including a crystal region containing a rare earth element (RE), barium (Ba), copper (Cu), and oxygen (O), and a void. In a cross section perpendicular to a surface of the first superconducting layer, the crystal region includes a path extending from the first superconducting layer to the second superconducting layer. The path includes a plurality of narrow portions, and a width of a minimum narrow portion having a minimum width among the narrow portions is equal to or more than 300 nm. In the cross section, an area ratio of the void is equal to or more than 30% and equal to or less than 70%.

Hereinafter, embodiments of the present disclosure will be described with reference to the drawings. In the following description, the same or similar members are denoted by the same reference numerals and the description of the members described once is appropriately omitted.

In the present specification, a "particle size" of a particle or the like refers to a major axis of the particle unless otherwise specified. The major axis of the particle is a maximum length among lengths between any two points on the outer periphery of the particle. In addition, a minor axis of the particle is a length of a line segment that passes through a midpoint of a line segment corresponding to the major axis, is perpendicular to the line segment, and has the outer periphery of the particle as both ends. In addition, an aspect ratio of the particle is a ratio of the major axis to the minor axis of the particle (major axis/minor axis). The major axis and the minor axis of the particle can be obtained, for example, by image analysis of a scanning electron microscope image (SEM image).

The detection of an element contained in the particles or the like and the measurement of an atomic concentration of the element can be performed using, for example, energy dispersive X-ray spectroscopy (EDX) or wavelength dispersive X-ray spectroscopy (WDX). In addition, the identification of a substance contained in the particles or the like can be performed using, for example, a powder X-ray diffraction method.

First Embodiment

A connection structure of a superconducting layer according to a first embodiment includes: a first superconducting layer; a second superconducting layer; and a connection layer provided between the first superconducting layer and the second superconducting layer and including a crystal region containing a rare earth element (RE), barium (Ba), copper (Cu), and oxygen (O), and a void. In a cross section perpendicular to a surface of the first superconducting layer, the crystal region includes a path extending from the first superconducting layer to the second superconducting layer, the path includes a plurality of narrow portions, and a width of a minimum narrow portion having a minimum width among the narrow portions is equal to or more than 300 nm. In the cross section, an area ratio of the void is equal to or more than 30% and equal to or less than 70%.

Figure 2:
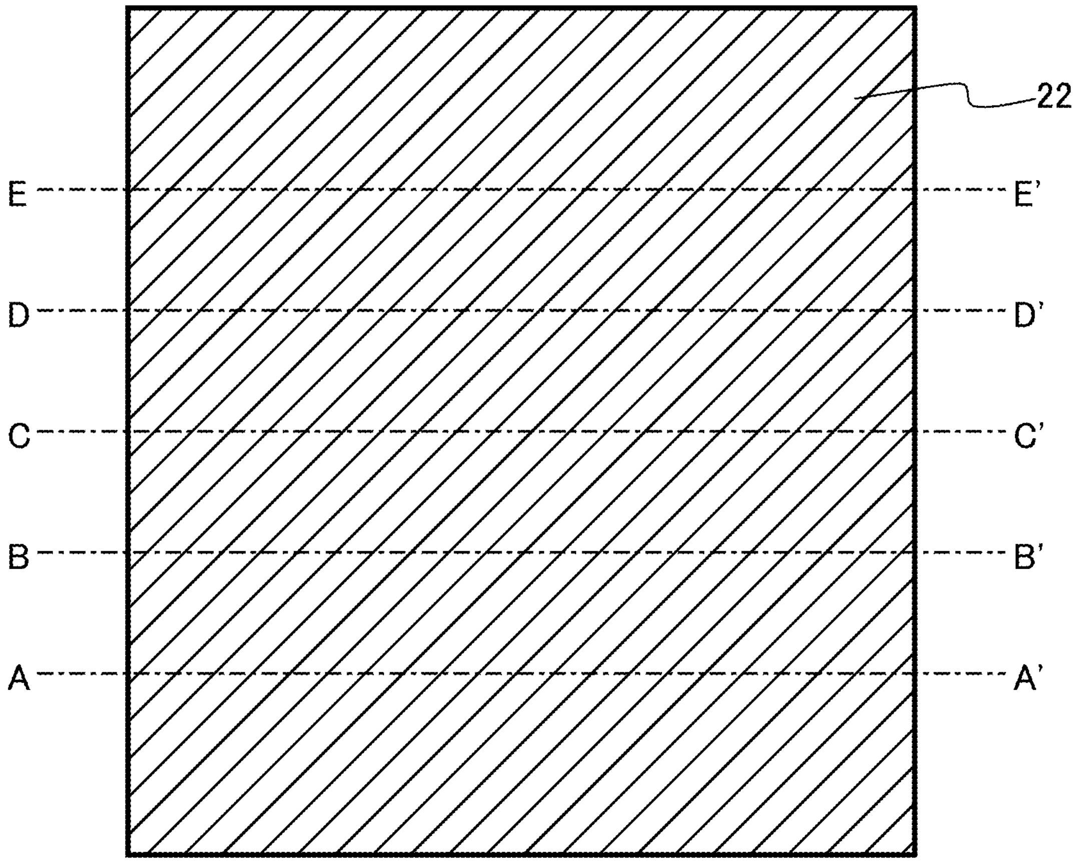
FIG. 2 is a schematic top view of the connection structure of the superconducting layer according to the first embodiment.

FIG. 1 is a schematic cross-sectional view of the connection structure of the superconducting layer according to the first embodiment. FIG. 2 is a schematic top view of the connection structure of the superconducting layer according to the first embodiment. FIG. 1 is a cross-sectional view taken along the line AA' of FIG. 2. FIG. 1 illustrates a cross section perpendicular to a surface of a first superconducting layer 16.

A connection structure 100 of the first embodiment is a structure that physically and electrically connects two superconducting layers. The connection structure 100 is used, for example, for connecting two superconducting wires and lengthening the superconducting wires.

The connection structure 100 includes a first superconducting member 10, a second superconducting member 20, and a connection layer 30. The connection structure 100 is a structure in which the first superconducting member 10 and the second superconducting member 20 are connected by the connection layer 30. The connection layer 30 is provided between the first superconducting member 10 and the second superconducting member 20.

The first superconducting member 10 includes a first substrate 12, a first intermediate layer 14, and a first superconducting layer 16. The second superconducting member 20 includes a second substrate 22, a second intermediate layer 24, and a second superconducting layer 26.

The first substrate 12 is, for example, a metal. The first substrate 12 is, for example, a nickel alloy or a copper alloy. The first substrate 12 is, for example, a nickel-chromium alloy.

The first superconducting layer 16 is, for example, an oxide superconducting layer. The first superconducting layer 16 contains, for example, a rare earth element (RE), barium (Ba), copper (Cu), and oxygen (O). The first superconducting layer 16 contains, for example, at least one rare earth element (RE) selected from the group consisting of yttrium (Y), lanthanum (La), neodymium (Nd), samarium (Sm), europium (Eu), gadolinium (Gd), dysprosium (Dy), holmium (Ho), erbium (Er), thulium (Tm), ytterbium (Yb), and lutetium (Lu).

The first superconducting layer 16 has, for example, a chemical composition represented by $(RE)Ba_2Cu_3O_\delta$ (RE is a rare earth element, $6 \le \delta \le 7$). Specifically, the first superconducting layer 16 has, for example, a chemical composition represented by $GdBa_2Cu_3O_\delta$ ($6 \le \delta \le 7$), $YBa_2Cu_3O_\delta$ ($6 \le \delta \le 7$), or $EuBa_2Cu_3O_\delta$ ($6 \le \delta \le 7$).

The first superconducting layer 16 includes, for example, a single crystal having a perovskite structure.

For example, the first superconducting layer 16 is formed on the first intermediate layer 14 using a metal organic decomposition method (MOD method), a pulsed laser deposition method (PLD method), or a metal organic chemical vapor deposition method (MOCVD method).

The first intermediate layer 14 is provided between the first substrate 12 and the first superconducting layer 16. The first intermediate layer 14 has a function of improving the crystal orientation of the first superconducting layer 16 formed on the first intermediate layer 14.

The first intermediate layer 14 contains, for example, a rare earth oxide. The first intermediate layer 14 has, for example, a stacked structure of a plurality of films. The first intermediate layer 14 has, for example, a structure in which yttrium oxide ($Y_2O_3$), yttria stabilized zirconia (YSZ), and cerium oxide ($CeO_2$) are stacked from the side of the first substrate 12.

The second substrate 22 is, for example, a metal. The second substrate 22 is, for example, a nickel alloy or a copper alloy. The second substrate 22 is, for example, a nickel-chromium alloy.

The second superconducting layer 26 is, for example, an oxide superconducting layer. The second superconducting layer 26 contains, for example, a rare earth element (RE), barium (Ba), copper (Cu), and oxygen (O). The first superconducting layer 16 contains, for example, at least one rare earth element (RE) selected from the group consisting of yttrium (Y), lanthanum (La), neodymium (Nd), samarium (Sm), europium (Eu), gadolinium (Gd), dysprosium (Dy), holmium (Ho), erbium (Er), thulium (Tm), ytterbium (Yb), and lutetium (Lu).

The second superconducting layer 26 has, for example, a chemical composition represented by $(RE)Ba_2Cu_3O_\delta$ (RE is a rare earth element, $6 \le \delta \le 7$). The second superconducting layer 26 has, for example, a chemical composition represented by $GdBa_2Cu_3O_\delta$ ($6 \le \delta \le 7$), $YBa_2Cu_3O_\delta$ ($6 \le \delta \le 7$), or $EuBa_2Cu_3O_\delta$ ($6 \le \delta \le 7$).

The second superconducting layer 26 includes, for example, a single crystal having a perovskite structure.

For example, the second superconducting layer 26 is formed on the second intermediate layer 24 using the MOD method, the PLD method, or the MOCVD method.

The second intermediate layer 24 is provided between the second substrate 22 and the second superconducting layer 26. The second intermediate layer 24 has a function of improving the crystal orientation of the second superconducting layer 26 formed on the second intermediate layer 24.

The second intermediate layer 24 contains, for example, a rare earth oxide. The second intermediate layer 24 has, for example, a stacked structure of a plurality of films. The second intermediate layer 24 has, for example, a structure in which yttrium oxide ($Y_2O_3$), yttria stabilized zirconia (YSZ), and cerium oxide ($CeO_2$) are stacked from the side of the second substrate 22.

The connection layer 30 is provided between the first superconducting layer 16 and the second superconducting layer 26. The connection layer 30 is in contact with the first superconducting layer 16. The connection layer 30 is in contact with the second superconducting layer 26.

The connection layer 30 is an oxide superconducting layer. The connection layer 30 contains a rare earth element (RE), barium (Ba), copper (Cu), and oxygen (O). The connection layer 30 contains, for example, at least one rare earth element (RE) selected from the group consisting of yttrium (Y), lanthanum (La), neodymium (Nd), samarium (Sm), europium (Eu), gadolinium (Gd), dysprosium (Dy), holmium (Ho), erbium (Er), thulium (Tm), ytterbium (Yb), and lutetium (Lu).

Figure 3:
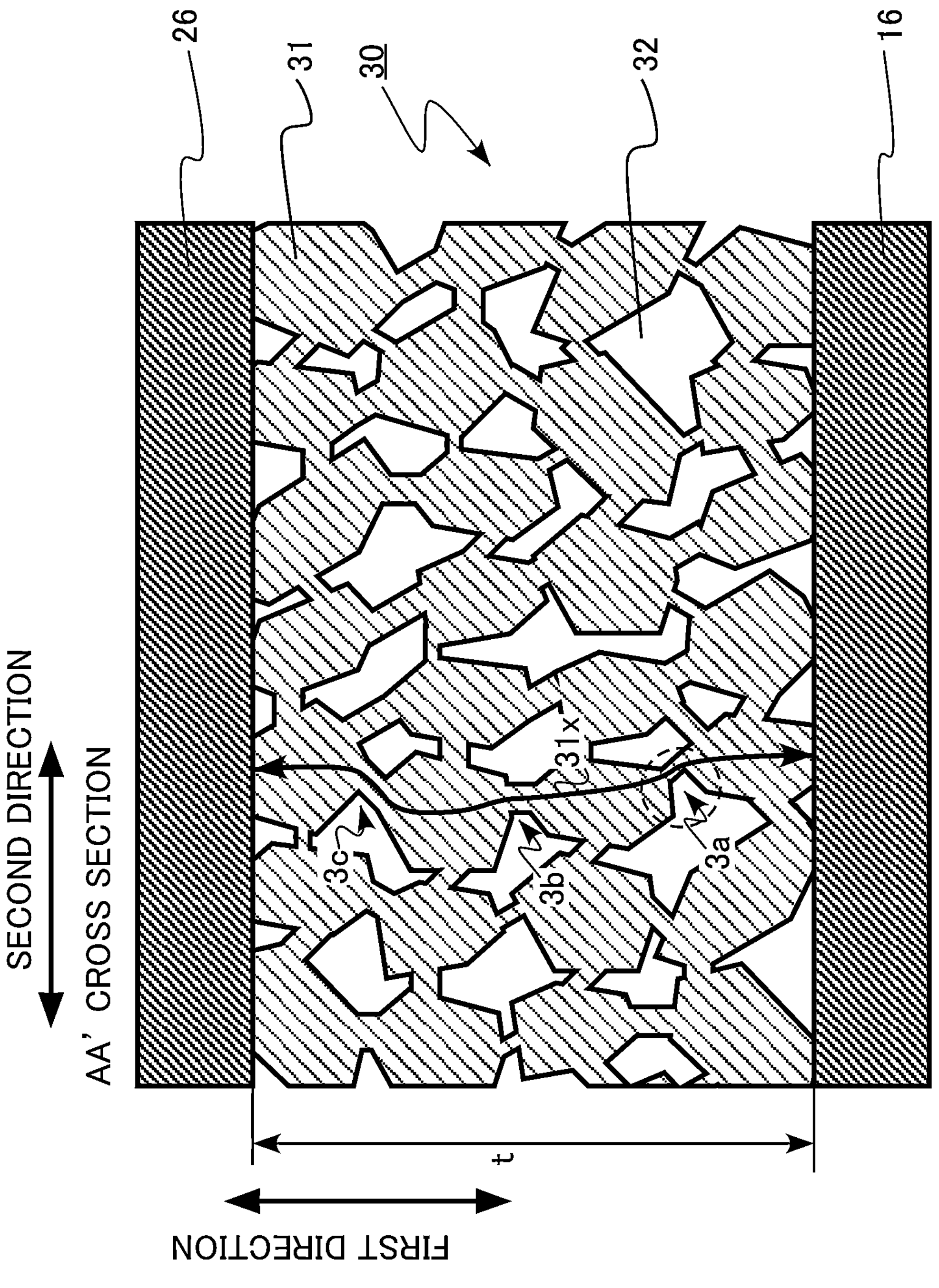
FIG. 3 is an enlarged schematic cross-sectional view of a part of a connection layer according to the first embodiment.

FIG. 3 is an enlarged schematic cross-sectional view of a part of the connection layer according to the first embodiment. FIG. 3 illustrates a cross section perpendicular to a surface of the first superconducting layer 16. FIG. 3 illustrates a cross section including the first superconducting layer 16, the second superconducting layer 26, and the connection layer 30. FIG. 3 is an enlarged schematic cross-sectional view of a part of FIG. 1.

The connection layer 30 includes a crystal region 31 and a void 32.

The crystal region 31 is polycrystalline. The crystal region 31 is formed by connecting a plurality of crystal particles. The crystal region 31 has a network structure. The crystal region 31 is porous.

The crystal region 31 contains a rare earth element (RE), barium (Ba), copper (Cu), and oxygen (O). The crystal region 31 contains, for example, at least one rare earth element (RE) selected from the group consisting of yttrium (Y), lanthanum (La), neodymium (Nd), samarium (Sm), europium (Eu), gadolinium (Gd), dysprosium (Dy), holmium (Ho), erbium (Er), thulium (Tm), ytterbium (Yb), and lutetium (Lu).

A major phase of the crystal region 31 is a rare earth oxide. The major phase of the crystal region 31 being the rare earth oxide means that a proportion occupied by the rare earth oxide is largest among phases constituting the crystal region 31. The crystal region 31 has a crystal of a perovskite structure containing, for example, gadolinium (Gd), barium (Ba), copper (Cu), and oxygen (O) as the major phase. In the crystal region 31, for example, an area ratio of the crystal of the perovskite structure containing gadolinium (Gd), barium (Ba), copper (Cu), and oxygen (O) is equal to or more than 90% in the cross section of the connection layer 30.

The crystal region 31 has, for example, a chemical composition represented by $(RE)Ba_2Cu_3O_\delta$ (RE is a rare earth element, $6 \leq \delta \leq 7$). Specifically, the crystal region 31 has, for example, a chemical composition represented by $GdBa_2Cu_3O_\delta$ ($6 \leq \delta \leq 7$), $YBa_2Cu_3O_\delta$ ($6 \leq \delta \leq 7$), or $EuBa_2Cu_3O_\delta$ ($6 \leq \delta \leq 7$).

The crystal region 31 is a superconductor.

The void 32 is filled with, for example, gas. The void 32 is filled with, for example, air. In a cross section perpendicular to the surface of the first superconducting layer 16, an area ratio of the void 32 is, for example, equal to or more than 30% and equal to or less than 70%.

The area ratio of the void 32 in the connection layer 30 can be obtained, for example, by the following method. An SEM image of the cross section perpendicular to the surface of the first superconducting layer 16 is acquired. The acquired SEM image is binarized using image processing software, and the connection layer 30 is divided into the crystal region 31 and the void 32. The area ratio of the void 32 in the connection layer 30 divided into the crystal region 31 and the void 32 is calculated using image processing software. For example, the area ratio of the void 32 in a region of 20 μm×20 μm of the SEM image is calculated.

In the cross section perpendicular to the surface of the first superconducting layer 16, a median value of a circle equivalent diameter of the void 32 is, for example, equal to or more than 200 nm and equal to or less than 10 μm. The median value of the circle equivalent diameter of the void 32 is calculated, for example, from the SEM image divided into the crystal region 31 and the void 32 by the image processing software using image processing software. For example, the median value of the circle equivalent diameter of the void 32 in the region of 20 μm×20 μm of the SEM image is calculated.

The crystal region 31 includes at least one path 31*x* extending from the first superconducting layer 16 to the second superconducting layer 26. In the path 31*x*, the crystal region 31 is continuous without being divided. In FIG. 3, a line representing the path 31*x* is indicated by a two-way arrow.

The path 31*x* is, for example, a shortest path extending from a position where the crystal region 31 is in contact with the first superconducting layer 16 to the second superconducting layer 26.

A length of the path 31*x* is larger than a thickness (t in FIG. 3) of the connection layer 30 in a first direction from the first superconducting layer 16 toward the second superconducting layer 26. The length of the path 31*x* is, for example, 1.2 times or more and 3 times or less the thickness t of the connection layer 30.

The thickness t of the connection layer 30 is, for example, equal to or more than 500 nm and equal to or less than 30 μm.

The path 31*x* is formed of, for example, one type of crystal. The path 31*x* is formed by crystals of only one type of crystal of the perovskite structure containing, for example, gadolinium (Gd), barium (Ba), copper (Cu), and oxygen (O). The path 31*x* may be formed of, for example, a plurality of types of crystals.

The path 31*x* includes a plurality of narrow portions. In other words, the narrow portion is a constriction of the crystal region 31 or a necking of the crystal region 31.

The path 31*x* illustrated in FIG. 3 includes three narrow portions of a first narrow portion 3*a*, a second narrow portion 3*b*, and a third narrow portion 3*c*. The number of narrow portions included in the path 31*x* may be 2 or equal to or more than 4. The crystal region 31 is formed by connecting a plurality of crystal particles at the narrow portion.

Among the first narrow portion 3*a*, the second narrow portion 3*b*, and the third narrow portion 3*c* included in the path 31*x* illustrated in FIG. 3, the first narrow portion 3*a* has a minimum width. The first narrow portion 3*a*, the second narrow portion 3*b*, and the third narrow portion 3*c* are examples of the narrow portions. The first narrow portion 3*a* is an example of a minimum narrow portion. Note that the width of the narrow portion means the minimum width of one narrow portion.

Figure 4:
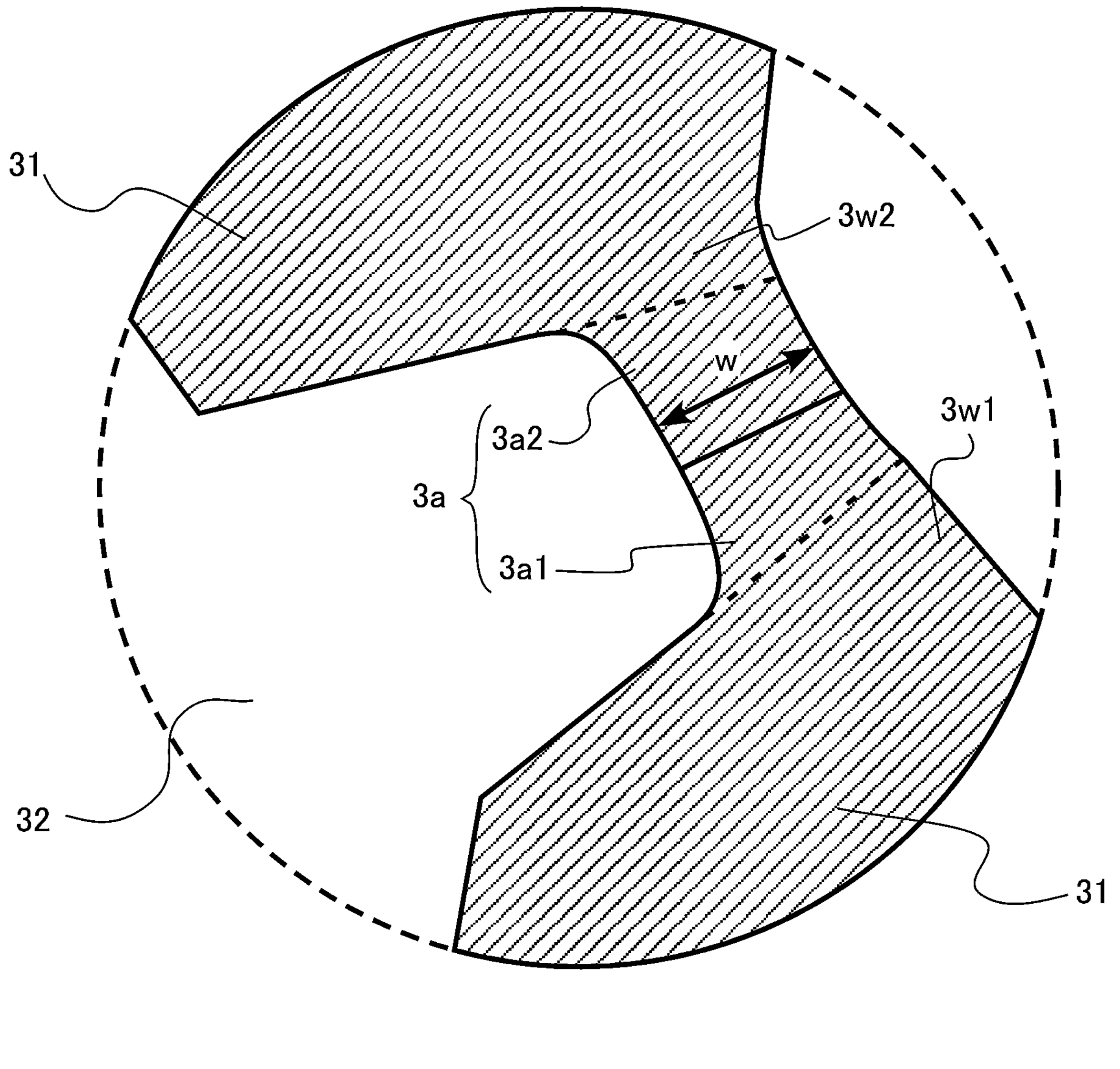
FIG. 4 is an enlarged schematic cross-sectional view of a part of the connection layer according to the first embodiment.

FIG. 4 is an enlarged schematic cross-sectional view of a part of the connection layer according to the first embodiment. FIG. 4 is an enlarged schematic cross-sectional view of a portion surrounded by a dotted circle in FIG. 3. FIG. 4 is an enlarged schematic cross-sectional view of the crystal region 31 including the first narrow portion 3*a*.

The width (w in FIG. 4) of the first narrow portion 3*a* is equal to or more than 300 nm. The width (w in FIG. 4) of the first narrow portion 3*a* is, for example, equal to or less than 3 μm.

The first narrow portion 3*a* is provided between a first wide portion 3*w*1 and a second wide portion 3*w*2. A width of the first wide portion 3*w*1 is larger than the width of the first narrow portion 3*a*. A width of the second wide portion 3*w*2 is larger than the width of the first narrow portion 3*a*.

The first narrow portion 3*a* includes a first portion 3*al* and a second portion 3*a*2. The first portion 3*al* has a crystal structure continuous with the first wide portion 3*w*1. The second portion 3*a*2 has a crystal structure continuous with the second wide portion 3*w*2.

It is possible to determine whether or not the first portion 3*al* has the crystal structure continuous with the first wide portion 3*w*1 and whether or not the second portion 3*a*2 has the crystal structure continuous with the second wide portion 3*w*2 by observing the crystal orientations of the first narrow portion 3*a*, the first wide portion 3*w*1, and the second wide portion 3*w*2 using a transmission electron microscope (TEM) or a scanning transmission electron microscope (STEM).

In a region having a width of 40 μm in a second direction perpendicular to the first direction from the first superconducting layer 16 toward the second superconducting layer 26 in a first cross section perpendicular to the surface of the first superconducting layer 16, the crystal region 31 includes five first paths extending from the first superconducting layer 16 to the second superconducting layer 26. Each of the first paths includes a plurality of narrow portions.

In a region having a width of 40 μm in the second direction in a second cross section parallel to the first cross section, the crystal region 31 includes five second paths extending from the first superconducting layer 16 to the second superconducting layer 26. Each of the second paths includes a plurality of narrow portions.

In a region having a width of 40 μm in the second direction in a third cross section parallel to the first cross section, the crystal region 31 includes five third paths extending from the first superconducting layer 16 to the second superconducting layer 26. Each of the third paths includes a plurality of narrow portions.

In a region having a width of 40 μm in the second direction in a fourth cross section parallel to the first cross section, the crystal region 31 includes five fourth paths extending from the first superconducting layer 16 to the second superconducting layer 26. Each of the fourth paths includes a plurality of narrow portions.

In a region having a width of 40 μm in the second direction in a fifth cross section parallel to the first cross section, the crystal region 31 includes five fifth paths extending from the first superconducting layer 16 to the second superconducting layer 26. Each of the fifth paths includes a plurality of narrow portions.

For example, a cross section taken along the line AA' illustrated in FIG. 2 is an example of the first cross section. For example, a cross section taken along the line BB' illustrated in FIG. 2 is an example of the second cross section. For example, a cross section taken along the line CC' illustrated in FIG. 2 is an example of the third cross section. For example, a cross section taken along the line DD' illustrated in FIG. 2 is an example of the fourth cross section. For example, a cross section taken along the line EE' illustrated in FIG. 2 is an example of the fifth cross section.

Figure 5:
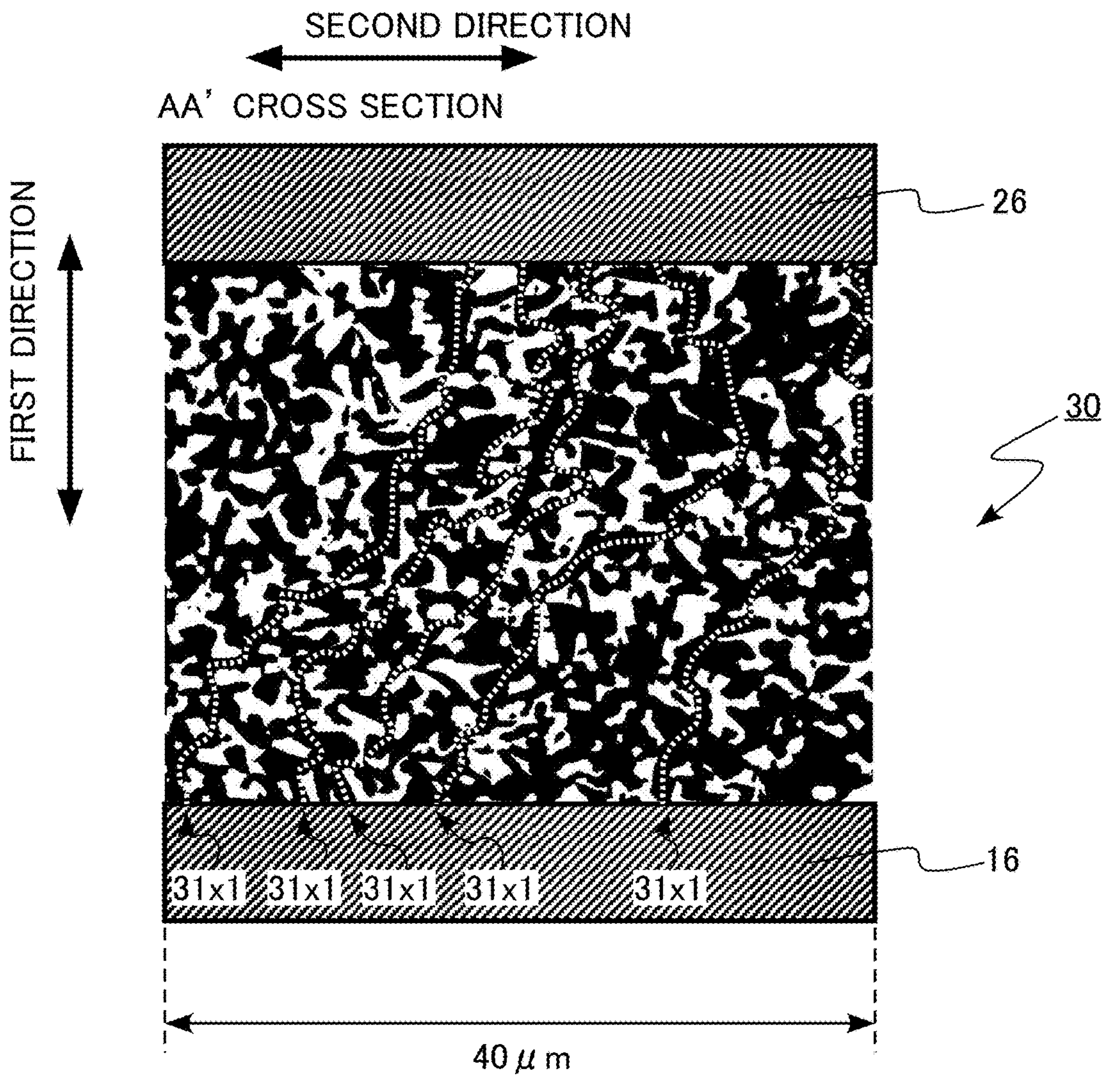
FIG. 5 is an enlarged cross-sectional view of a part of the connection layer according to the first embodiment.

FIG. 5 is an enlarged cross-sectional view of a part of the connection layer according to the first embodiment. FIG. 5 illustrates a part of the AA' cross section illustrated in FIG. 2. FIG. 5 illustrates an example of the first cross section. FIG. 5 illustrates a region having a width of 40 μm in the second direction.

FIG. 5 includes an SEM image of the connection layer 30 in the AA' cross section. In the connection layer 30 illustrated in FIG. 5, the SEM image is binarized using image processing software, and the connection layer 30 is divided into the crystal region 31 and the void 32.

In FIG. 5, a black region is the crystal region 31. In addition, in FIG. 5, a white region is the void 32. In addition, in FIG. 5, a white dotted line is the path.

As illustrated in FIG. 5, in the region where the width of the AA' cross section in the second direction is 40 μm, the crystal region 31 includes five first paths **31*x*1 extending from the first superconducting layer 16 to the second superconducting layer 26. The five first paths 31*x*1** do not intersect each other.

In FIG. 5, a line representing the first path **31*x*1 is indicated by a dotted line. Each of the first paths 31*x*1 includes a plurality of narrow portions. Note that the crystal region 31 may include six or more first paths 31*x*1. In a case where six or more first paths 31*x*1 are included in the crystal region 31, for example, arbitrary five first paths 31*x*1** are selected.

Similarly to FIG. 5, in the region where the width of the BB' cross section in the second direction is 40 μm, the crystal region 31 includes five second paths extending from the first superconducting layer 16 to the second superconducting layer 26. Further, similarly to FIG. 5, in the region where the width of the CC' cross section in the second direction is 40 μm, the crystal region 31 includes five third paths extending from the first superconducting layer 16 to the second superconducting layer 26. Further, similarly to FIG. 5, in the region where the width of the DD' cross section in the second direction is 40 μm, the crystal region 31 includes five fourth paths extending from the first superconducting layer 16 to the second superconducting layer 26. Further, similarly to FIG. 5, in the region where the width of the EE' cross section in the second direction is 40 μm, the crystal region 31 includes five fifth paths extending from the first superconducting layer 16 to the second superconducting layer 26.

Among the five first paths, the five second paths, the five third paths, the five fourth paths, and the five fifth paths, a ratio of paths in which the width of the minimum narrow portion is equal to or more than 300 nm is, for example, equal to or more than 80%.

Next, an example of a method for manufacturing the connection structure of the superconducting layer according to the first embodiment will be described.

First, an oxide superconductor containing a rare earth element (RE), barium (Ba), copper (Cu), and oxygen (O) is formed.

The oxide superconductor is formed, for example, by a solid state reaction method. In the formation of the oxide superconductor, powders of $Gd_2O_3$, $BaCO_3$, and CuO are mixed and compression-molded to produce a green compact. By sintering the green compact, an oxide superconductor having a composition of $GdBa_2Cu_3O_\delta$ ($6 \le \delta \le 7$) is formed. Gd may be replaced with Y, La, Nd, Sm, Eu, Dy, Ho, Er, Tm, Yb, or Lu.

The oxide superconductor is pulverized to produce a plurality of crystal particles. The plurality of crystal particles are heat-treated in an oxygen atmosphere. The plurality of crystal particles are classified to prepare a crystal particle group having a median value of a major axis equal to or more than 1 μm and equal to or less than 10 μm and having a unimodal distribution. A median value of an aspect ratio of the crystal particles of the crystal particle group is, for example, equal to or less than 5.

Next, the connection layer 30 is formed using the MOD method.

An organometallic salt solution is produced using powders of $Gd(OCOCH_3)_2$, $Ba(OCOCH_3)_2$, and $Cu(OCOCH_3)_2$. The produced organometallic salt solution is mixed with the prepared crystal particle group. Gd may be replaced with Y, La, Nd, Sm, Eu, Dy, Ho, Er, Tm, Yb, or Lu.

Next, the organometallic salt solution mixed with the crystal particles is applied onto the first superconducting layer 16. The organometallic salt solution mixed with the crystal particles is a slurry. The first superconducting member 10 in which a slurry having an appropriate thickness has been applied onto the first superconducting layer 16 is dried and then fired in oxygen at 700° C. or more and 850° C. or less to form the connection layer 30.

Next, a first heat treatment is performed. In the first heat treatment, firing is performed in a state where the connection layer 30 formed on the first superconducting layer 16 is sandwiched between the first superconducting layer 16 and the second superconducting layer 26. In the first heat treatment, the superposed first superconducting layer 16 and second superconducting layer 26 are pressurized in a direction from the second superconducting layer 26 toward the first superconducting layer 16.

In the first heat treatment, by firing the organometallic salt solution at a low oxygen partial pressure of 1000 ppm or less, the narrow portion connecting the adjacent crystal particles and the crystal particles is formed.

The firing temperature in the first heat treatment is equal to or higher than 720° C. and equal to or lower than 850° C. When the firing temperature is lower than 720° C., formation of the narrow portion becomes insufficient. When the firing temperature is lower than 720° C., the area ratio of the void in the connection layer 30 increases.

Therefore, the electrical resistance of the connection structure 100 of the superconducting layer increases, and the mechanical strength decreases.

When the firing temperature of the first heat treatment exceeds 850° C., superconducting characteristics of the first superconducting layer 16, the second superconducting layer 26, and the connection layer 30 disappear.

The firing is performed in a state where the entire connection structure is sandwiched between metal plates such as stainless steel and pressurized. A pressure at the time of pressurization is equal to or more than 10 MPa and equal to or less than 100 MPa. When the pressure at the time of pressurization is less than 10 MPa, the formation of the narrow portion is insufficient, so that the electrical resistance of the connection structure 100 of the superconducting layer increases, and the mechanical strength decreases. When the pressure at the time of pressurization exceeds 100 MPa, the area ratio of the void in the connection layer 30 is less than 30%.

After the first heat treatment, the second heat treatment is performed. In the second heat treatment, oxygen annealing is performed in an oxygen atmosphere. The second heat treatment is performed, for example, at 500° C.

During the second heat treatment, oxygen is supplied to the inside of the connection layer 30 through the void 32, and superconducting characteristics are developed in the crystal region 31.

The first superconducting layer 16 and the second superconducting layer 26 are connected by the above manufacturing method. The connection structure 100 of the superconducting layer according to the first embodiment is formed by the above manufacturing method.

Next, functions and the like of the connection structure of the superconducting layer according to the first embodiment will be described.

For example, in a nuclear magnetic resonance apparatus (NMR) or a magnetic resonance imaging apparatus (MRI), a superconducting coil is used to generate a strong magnetic field. The superconducting coil is formed by winding a superconducting wire around a winding frame.

In order to lengthen the superconducting wire, for example, a plurality of superconducting wires are connected. For example, ends of two superconducting wires are connected using a connection structure. The connection structure for connecting the superconducting wires is required to have low electrical resistance and high mechanical strength. The low electrical resistance means that a critical current is high.

Figure 6:
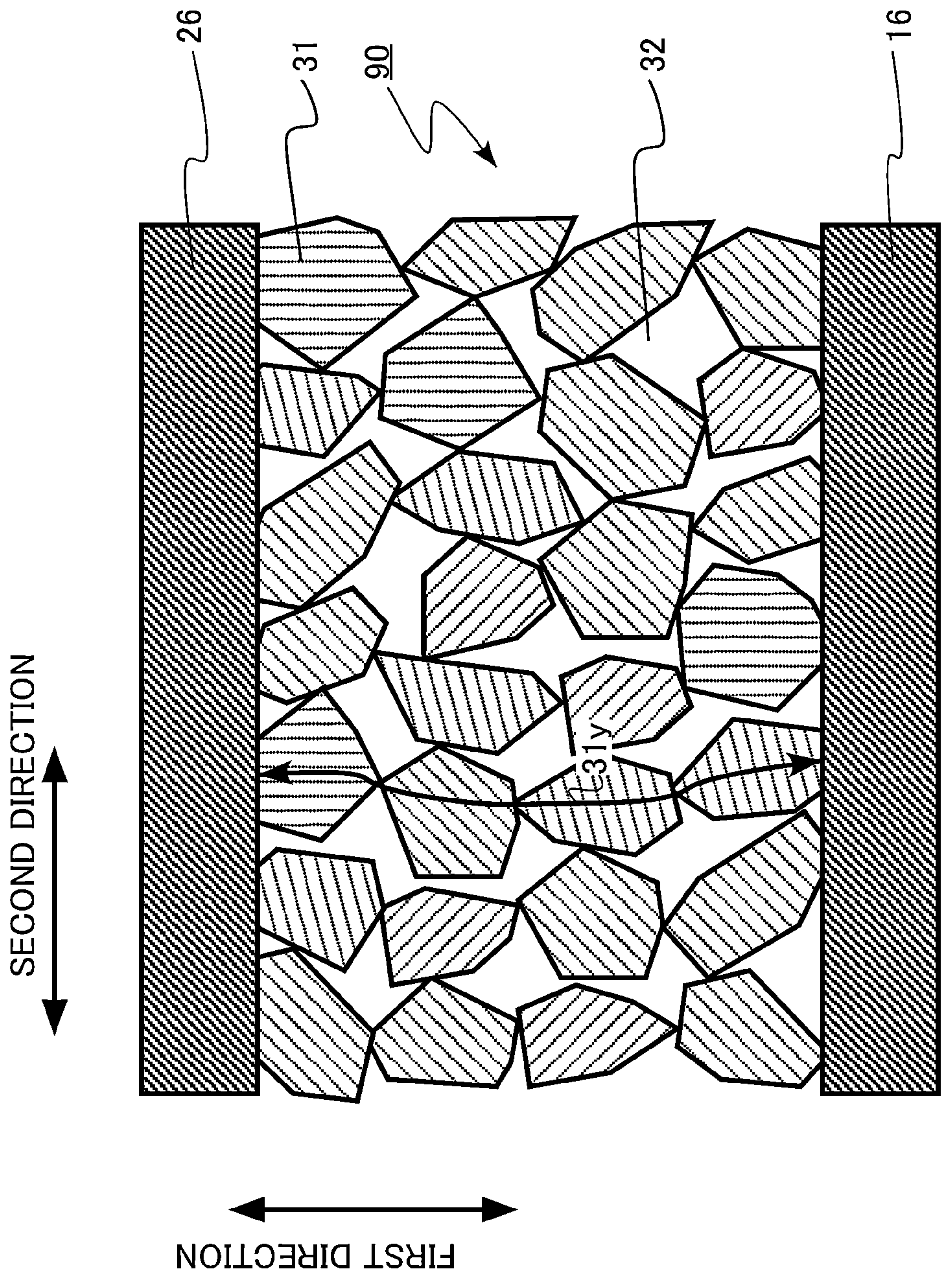
FIG. 6 is an enlarged schematic cross-sectional view of a part of a connection layer according to a comparative example.

FIG. 6 is an enlarged schematic cross-sectional view of a part of a connection layer according to a comparative example. FIG. 6 is a diagram corresponding to FIG. 3. A connection layer 90 of the comparative example is different from the connection layer 30 of the first embodiment in that a path 31*y* of the crystal region 31 extending from the first superconducting layer 16 to the second superconducting layer 26 does not include a narrow portion.

As illustrated in FIG. 6, in the connection layer 90 of the comparative example, the crystal region 31 includes the continuous path 31*y* extending from the first superconducting layer 16 to the second superconducting layer 26. However, the path 31*y* is continuous by point contact between two adjacent crystal particles, and no narrow portion connecting the two adjacent crystal particles is formed.

The connection layer 90 of the comparative example is manufactured, for example, by not using an organometallic salt solution in the method for manufacturing the connection structure of the superconducting layer according to the first embodiment. By not using the organometallic salt solution, a narrow portion connecting adjacent crystal particles and crystal particles is not formed in firing at 850° C. or lower.

For example, the connection layer 90 of the comparative example is manufactured by setting the median value of the major axis of the crystal particle to be larger than 10 μm, setting the firing temperature to be lower than 700° C., or setting the pressure at the time of pressurization to be less than 10 MPa in the method for manufacturing the connection structure of the superconducting layer according to the first embodiment. By setting the median value of the major axis of the crystal particle to be larger than 10 μm, setting the firing temperature to be lower than 700° C., or setting the pressure at the time of pressurization to be less than 10 MPa, the formation of a narrow portion from the organometallic salt solution is suppressed.

In the connection structure 100 of the superconducting layer according to the first embodiment, the crystal region 31 of the connection layer 30 includes the path 31*x* extending from the first superconducting layer 16 to the second superconducting layer 26. The path 31*x* includes a plurality of narrow portions, and the width of the minimum narrow portion having the minimum width among the plurality of narrow portions is equal to or more than 300 nm. The area ratio of the void 32 is equal to or more than 30% and equal to or less than 70%.

In the connection layer 30 of the first embodiment, the path 31*x* includes the narrow portion in which the width of the minimum narrow portion is equal to or more than 300 nm, so that the minimum path width is larger than that of the connection layer 90 of the comparative example in which the adjacent crystal particles are in point contact and the path 31*y* does not include a narrow portion. The minimum path width is large, so that the electrical resistance of the path decreases. In addition, the minimum path width is large, so that the mechanical strength increases.

Therefore, the connection layer 30 of the first embodiment can realize low electrical resistance and high mechanical strength as compared with the connection layer 90 of the comparative example. Accordingly, according to the first embodiment, the connection structure 100 of the superconducting layer having low electrical resistance and high mechanical strength can be realized.

From the viewpoint of realizing the connection structure 100 of the superconducting layer having low electrical resistance and high mechanical strength, the width of the minimum narrow portion is preferably equal to or more than 500 nm, and more preferably equal to or more than 700 nm.

From the viewpoint of realizing the connection structure 100 of the superconducting layer having low electrical resistance and high mechanical strength, the ratio of the paths in which the width of the minimum narrow portion is equal to or more than 300 nm among the five first paths, the five second paths, the five third paths, the five fourth paths, and the five fifth paths included in the connection layer 30 is preferably equal to or more than 80%, and more preferably equal to or more than 90%.

From the viewpoint of reducing the area ratio of the crystal region 31 of the connection layer 30 and setting the area ratio of the void 32 of the connection layer 30 to be equal to or more than 30%, the width of the minimum narrow portion is preferably equal to or less than 3 μm, more preferably equal to or less than 2 μm, and still more preferably equal to or less than 1 μm.

By setting the area ratio of the void 32 of the connection layer 30 to be equal to or more than 30%, oxygen is sufficiently supplied to the inside of the connection layer 30 at the time of oxygen annealing. The oxygen is sufficiently supplied, so that sufficient superconducting characteristics are developed in the crystal region 31. Therefore, the connection structure 100 of the superconducting layer having low electrical resistance can be realized.

From the viewpoint of realizing the connection structure 100 of the superconducting layer having low electrical resistance, the area ratio of the void 32 in the connection layer 30 is preferably equal to or more than 35%, and more preferably equal to or more than 40%.

In addition, by setting the area ratio of the void 32 of the connection layer 30 to be equal to or less than 70%, the mechanical strength of the connection layer 30 is maintained. Therefore, the connection structure 100 of the superconducting layer having high mechanical strength can be realized.

From the viewpoint of realizing the connection structure 100 of the superconducting layer having high mechanical strength, the area ratio of the void 32 in the connection layer 30 is preferably equal to or less than 65%, and more preferably equal to or less than 60%.

The median value of the circle equivalent diameter of the void 32 is preferably equal to or more than 200 nm and equal to or less than 10 μm, and more preferably equal to or more than 500 nm and equal to or less than 5 μm. The median value of the circle equivalent diameter of the void 32 satisfies the above lower limit, so that the supply of oxygen to the inside of the connection layer 30 is promoted at the time of oxygen annealing. Therefore, the connection structure 100 of the superconducting layer having low electrical resistance can be realized. In addition, the median value of the circle equivalent diameter of the void 32 satisfies the above upper limit, so that the mechanical strength of the connection structure 100 of the superconducting layer is further improved.

As described above, according to the connection structure of the superconducting layer of the first embodiment, low electrical resistance and high mechanical strength can be realized.

Second Embodiment

A superconducting wire according to a second embodiment includes: a first superconducting wire including a first superconducting layer; a second superconducting wire including a second superconducting layer; a third superconducting layer; a first connection layer provided between the first superconducting layer and the third superconducting layer and including a crystal region containing a rare earth element (RE), barium (Ba), copper (Cu), and oxygen (O), and a void; and a second connection layer provided between the second superconducting layer and the third superconducting layer and including a crystal region containing a rare earth element (RE), barium (Ba), copper (Cu), and oxygen (O), and a void. In a cross section perpendicular to a surface of the first superconducting layer, the crystal region of the first connection layer includes a path extending from the first superconducting layer to the third superconducting layer, the path includes a plurality of narrow portions, and a width of a minimum narrow portion having a minimum width among the narrow portions is equal to or more than 300 nm. In the cross section, an area ratio of the void of the first connection layer is equal to or more than 30% and equal to or less than 70%. The superconducting wire of the second embodiment uses a connection structure of a superconducting layer of the first embodiment as a structure for connecting the first superconducting wire and the second superconducting wire. Hereinafter, description of contents overlapping with those of the first embodiment will be partially omitted.

Figure 7:
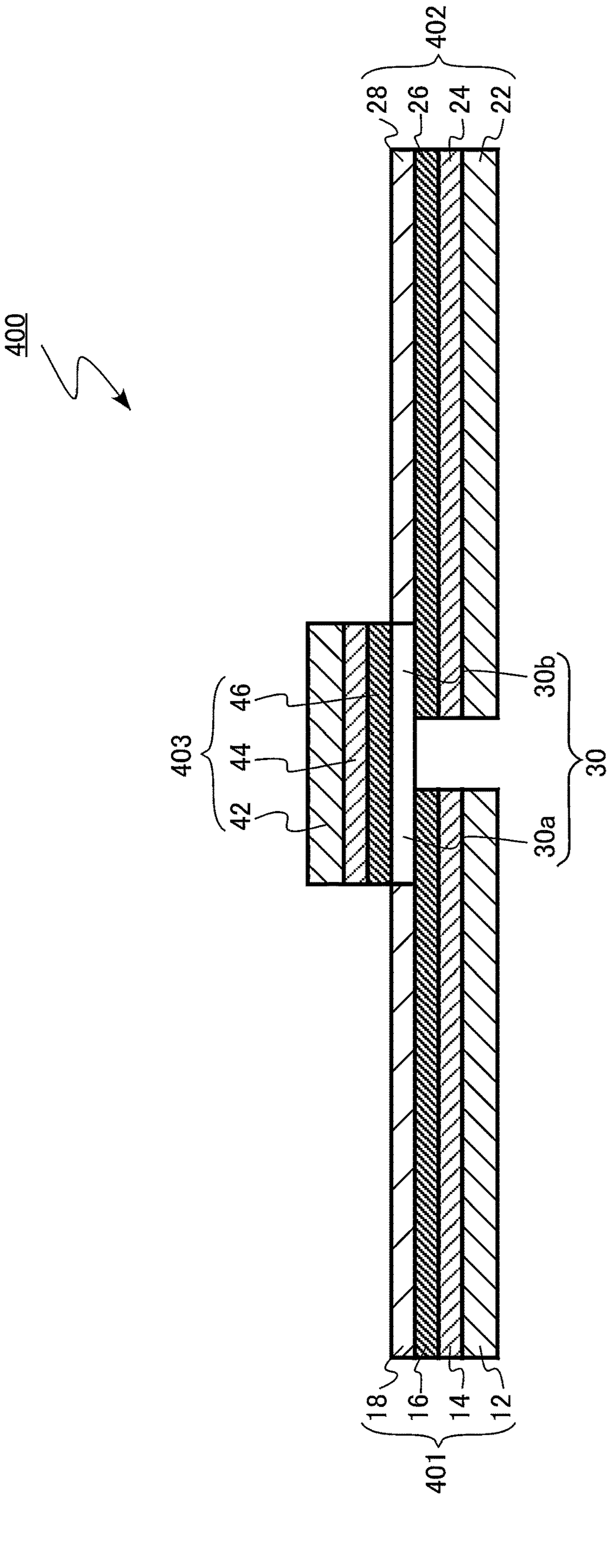
FIG. 7 is a schematic cross-sectional view of a superconducting wire according to a second embodiment.

FIG. 7 is a schematic cross-sectional view of the superconducting wire according to the second embodiment. A superconducting wire 400 of the second embodiment includes a first superconducting wire 401, a second superconducting wire 402, and a connection member 403. The superconducting wire 400 of the second embodiment is lengthened by connecting the first superconducting wire 401 and the second superconducting wire 402 using the connection member 403.

The first superconducting wire 401 includes a first substrate 12, a first intermediate layer 14, a first superconducting layer 16, and a first protective layer 18. The second superconducting wire 402 includes a second substrate 22, a second intermediate layer 24, a second superconducting layer 26, and a second protective layer 28. The connection member 403 includes a third substrate 42, a third intermediate layer 44, and a third superconducting layer 46.

The first superconducting wire 401, the second superconducting wire 402, and the connection member 403 have structures similar to those of a first superconducting member 10 and a second superconducting member 20 of the first embodiment.

A connection layer 30 includes a first connection layer **30*a* and a second connection layer 30*b***.

The first connection layer **30*a* is provided between the first superconducting layer 16 and the third superconducting layer 46. The first connection layer 30*a* is in contact with the first superconducting layer 16. The first connection layer 30*a* is in contact with the third superconducting layer 46**.

The second connection layer **30*b* is provided between the second superconducting layer 26 and the third superconducting layer 46. The second connection layer 30*b* is in contact with the second superconducting layer 26. The second connection layer 30*b* is in contact with the third superconducting layer 46**.

The first connection layer **30*a* between the first superconducting layer 16 and the third superconducting layer 46 and the second connection layer 30*b* between the second superconducting layer 26 and the third superconducting layer 46** are continuous.

The connection layer 30 does not exist, for example, between the first superconducting layer 16 and the second superconducting layer 26. A space between the first superconducting layer 16 and the second superconducting layer 26 is, for example, an air gap. In addition, the first superconducting layer 16 and the second superconducting layer 26 may be in contact with each other.

The connection layer 30 is an oxide superconducting layer. The connection layer 30 contains a rare earth element (RE), barium (Ba), copper (Cu), and oxygen (O). The connection layer 30 contains, for example, a rare earth element (RE), barium (Ba), copper (Cu), and oxygen (O). The connection layer 30 contains, for example, at least one rare earth element (RE) selected from the group consisting of yttrium (Y), lanthanum (La), neodymium (Nd), samarium (Sm), europium (Eu), gadolinium (Gd), dysprosium (Dy), holmium (Ho), erbium (Er), thulium (Tm), ytterbium (Yb), and lutetium (Lu).

The connection layer 30 of the second embodiment has a configuration similar to that of a connection layer 30 of the first embodiment illustrated in FIG. 3.

Figure 8:
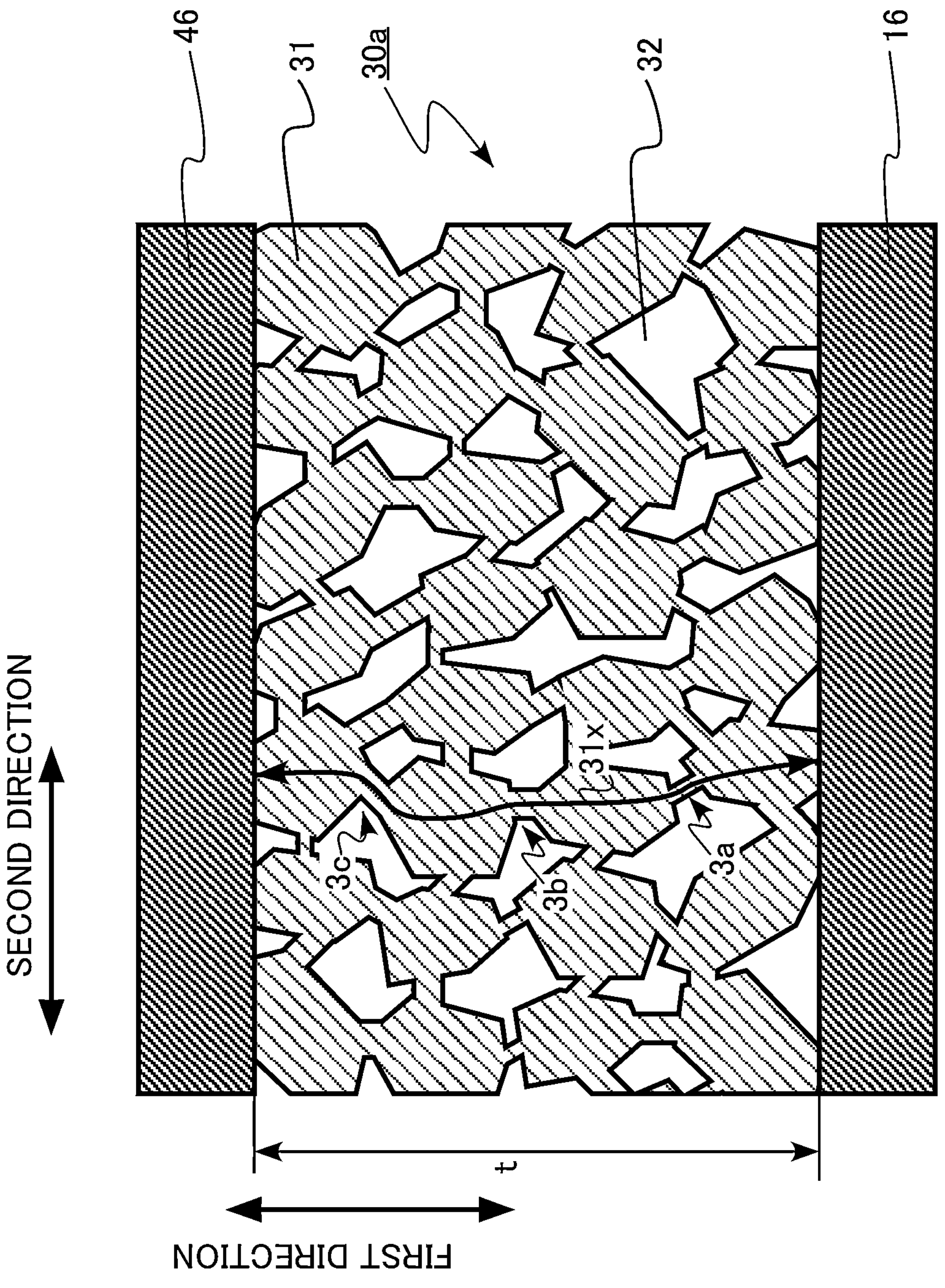
FIG. 8 is an enlarged schematic cross-sectional view of a part of a first connection layer according to the second embodiment.

FIG. 8 is an enlarged schematic cross-sectional view of a part of the first connection layer according to the second embodiment. FIG. 8 is a diagram corresponding to FIG. 3 illustrating the first embodiment.

The first connection layer 30*a* of the second embodiment is different from the connection layer 30 of the first embodiment only in that a second superconducting layer 26 in FIG. 3 is replaced with the third superconducting layer 46.

Figure 9:
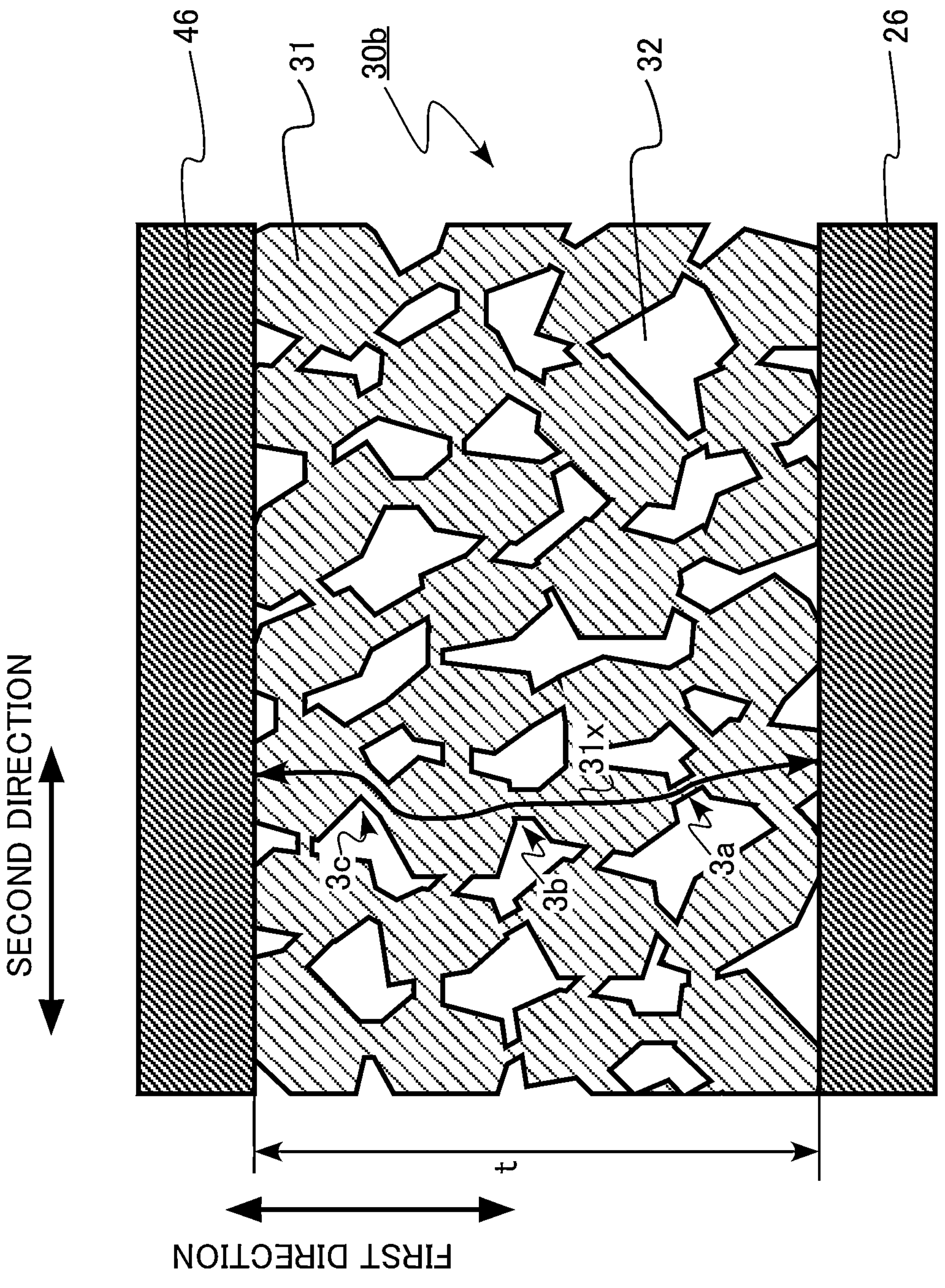
FIG. 9 is an enlarged schematic cross-sectional view of a part of a second connection layer according to the second embodiment.

FIG. 9 is an enlarged schematic cross-sectional view of a part of the second connection layer according to the second embodiment. FIG. 9 is a diagram corresponding to FIG. 3 illustrating the first embodiment.

The second connection layer 30*b* of the second embodiment is different from the connection layer 30 of the first embodiment only in that a first superconducting layer 16 in FIG. 3 is replaced with the second superconducting layer 26 and that a second superconducting layer 26 in FIG. 3 is replaced with the third superconducting layer 46.

In the superconducting wire 400 of the second embodiment, for example, a current flows from the first superconducting wire 401 to the second superconducting wire 402 through the first connection layer 30*a*, the connection member 403, and the second connection layer 30*b*.

By connecting the first superconducting wire 401 and the connection member 403 using the first connection layer 30*a*, a connection structure for connecting the first superconducting wire 401 and the connection member 403 has low electrical resistance and high mechanical strength. In addition, by connecting the second superconducting wire 402 and the connection member 403 using the second connection layer 30*b*, a connection structure for connecting the second superconducting wire 402 and the connection member 403 has low electrical resistance and high mechanical strength.

Therefore, a connection structure for connecting the first superconducting wire 401 and the second superconducting wire 402 has low electrical resistance and high mechanical strength. Accordingly, the superconducting wire 400 has low electrical resistance and high mechanical strength.

Note that it is also possible to connect three or more superconducting wires to form a further lengthened superconducting wire.

(First Modification)

Figure 10:
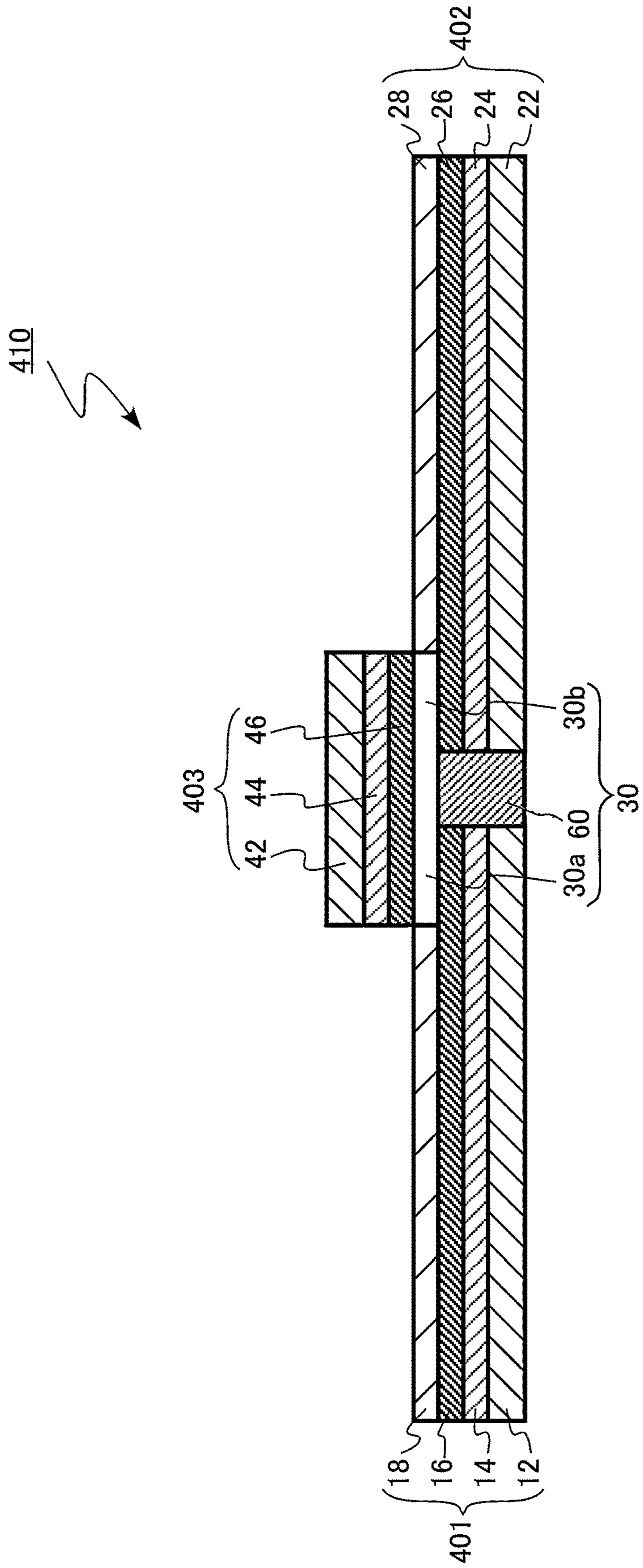
FIG. 10 is a schematic cross-sectional view of a first modification of the superconducting wire according to the second embodiment.

FIG. 10 is a schematic cross-sectional view of a first modification of the superconducting wire according to the second embodiment. A superconducting wire 410 of the first modification of the second embodiment is different from the superconducting wire 400 of the second embodiment in including a reinforcing material 60.

The reinforcing material 60 is provided between the first superconducting wire 401 and the second superconducting wire 402. The reinforcing material 60 is provided, for example, between the first superconducting layer 16 and the second superconducting layer 26.

The reinforcing material 60 is in contact with, for example, the first superconducting wire 401 and the second superconducting wire 402. The reinforcing material 60 is in contact with, for example, the connection layer 30.

By providing the reinforcing material 60, the mechanical strength of the superconducting wire 410 is improved.

The reinforcing material 60 is, for example, a metal or resin. The reinforcing material 60 is, for example, a solder. The reinforcing material 60 is, for example, a solder containing silver (Ag) and indium (In).

(Second Modification)

Figure 11:
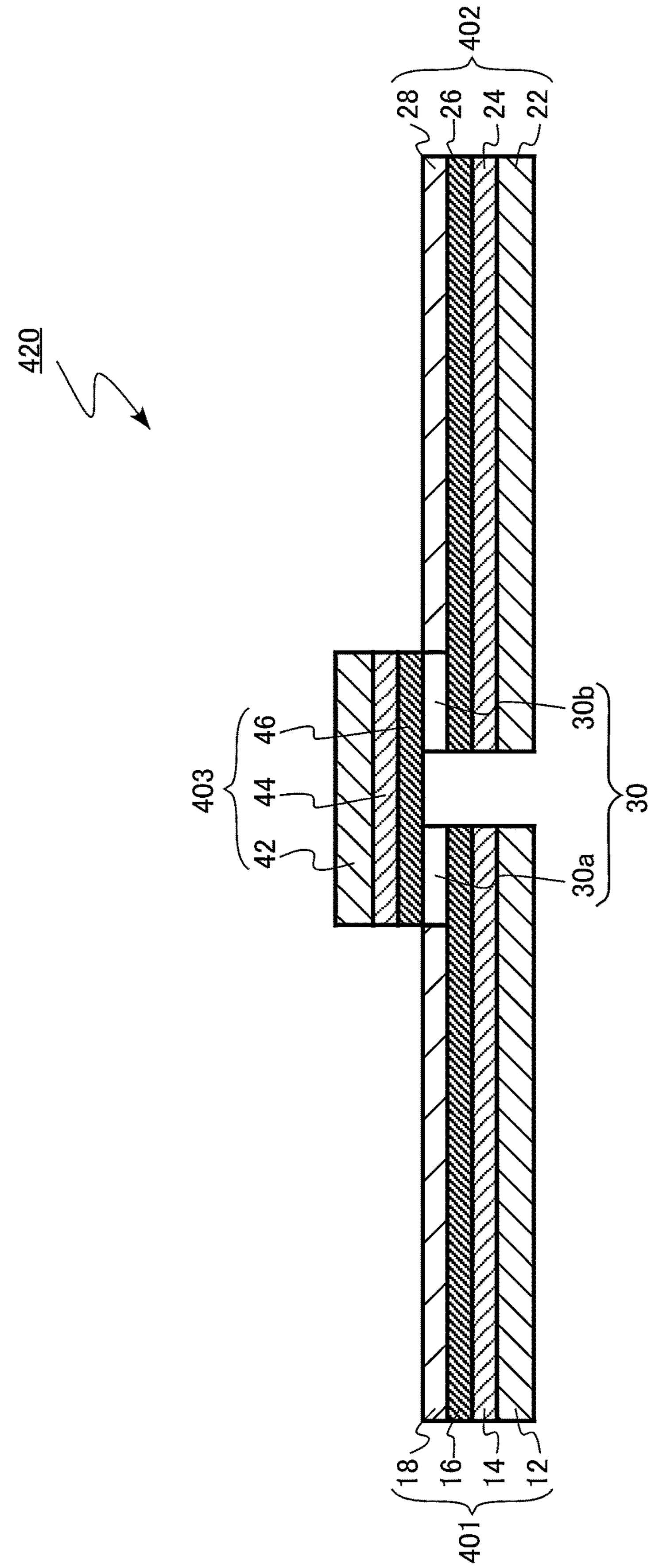
FIG. 11 is a schematic cross-sectional view of a second modification of the superconducting wire according to the second embodiment.

FIG. 11 is a schematic cross-sectional view of a second modification of the superconducting wire according to the second embodiment. A superconducting wire 420 of the second modification of the second embodiment is different from the superconducting wire 400 of the second embodiment in that a first connection layer 30*a* and a second connection layer 30*b* are separated from each other.

The first connection layer 30*a* and the second connection layer 30*b* are separated.

(Third Modification)

Figure 12:
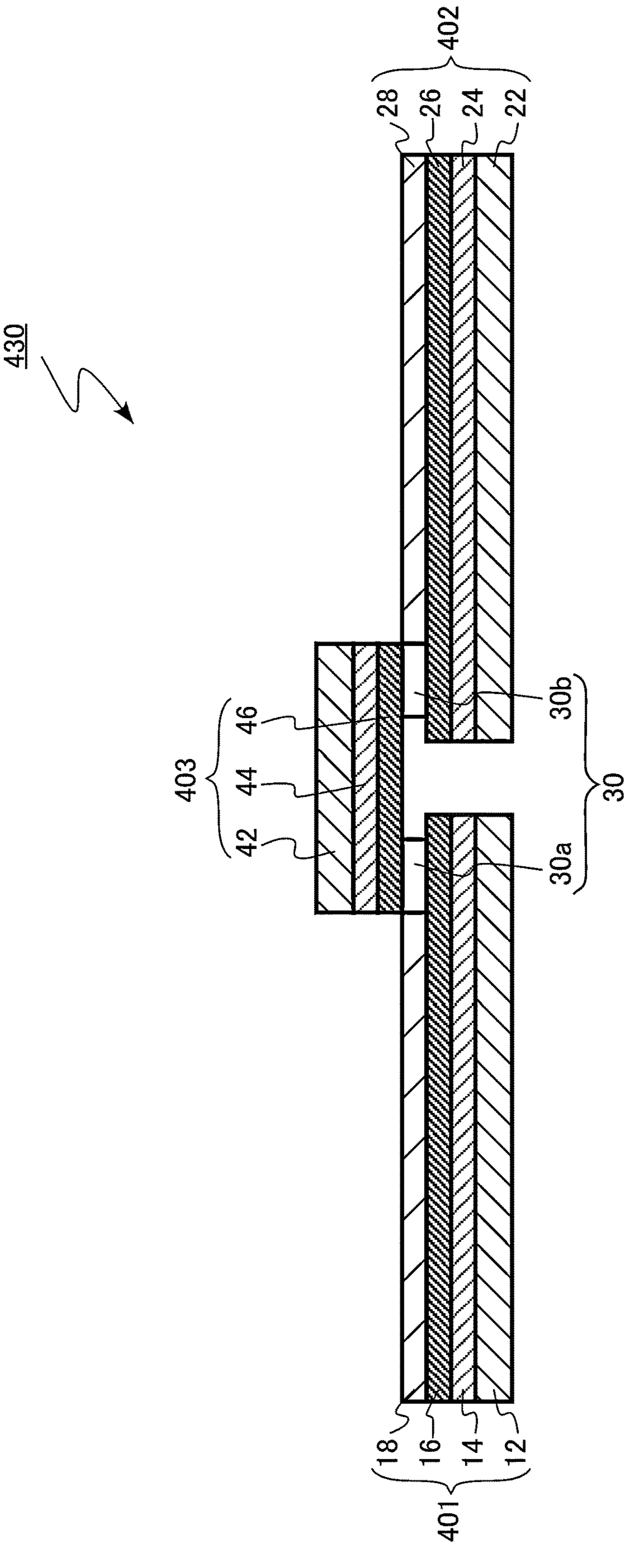
FIG. 12 is a schematic cross-sectional view of a third modification of the superconducting wire according to the second embodiment.

FIG. 12 is a schematic cross-sectional view of a third modification of the superconducting wire according to the second embodiment. A superconducting wire 430 of a third modification of the second embodiment is different from the superconducting wire 420 of the second modification of the second embodiment in that a part of a surface of a first superconducting layer 16 facing a third superconducting layer 46 is exposed and a part of a surface of a second superconducting layer 26 facing the third superconducting layer 46 is exposed.

There is a region where the connection layer 30 does not exist in the vicinity of an end of a top surface of the first superconducting layer 16 on the side of the second superconducting layer 26. In addition, there is a region where the connection layer 30 does not exist in the vicinity of an end of a top surface of the second superconducting layer 26 on the side of the first superconducting layer 16.

(Fourth Modification)

Figure 13:
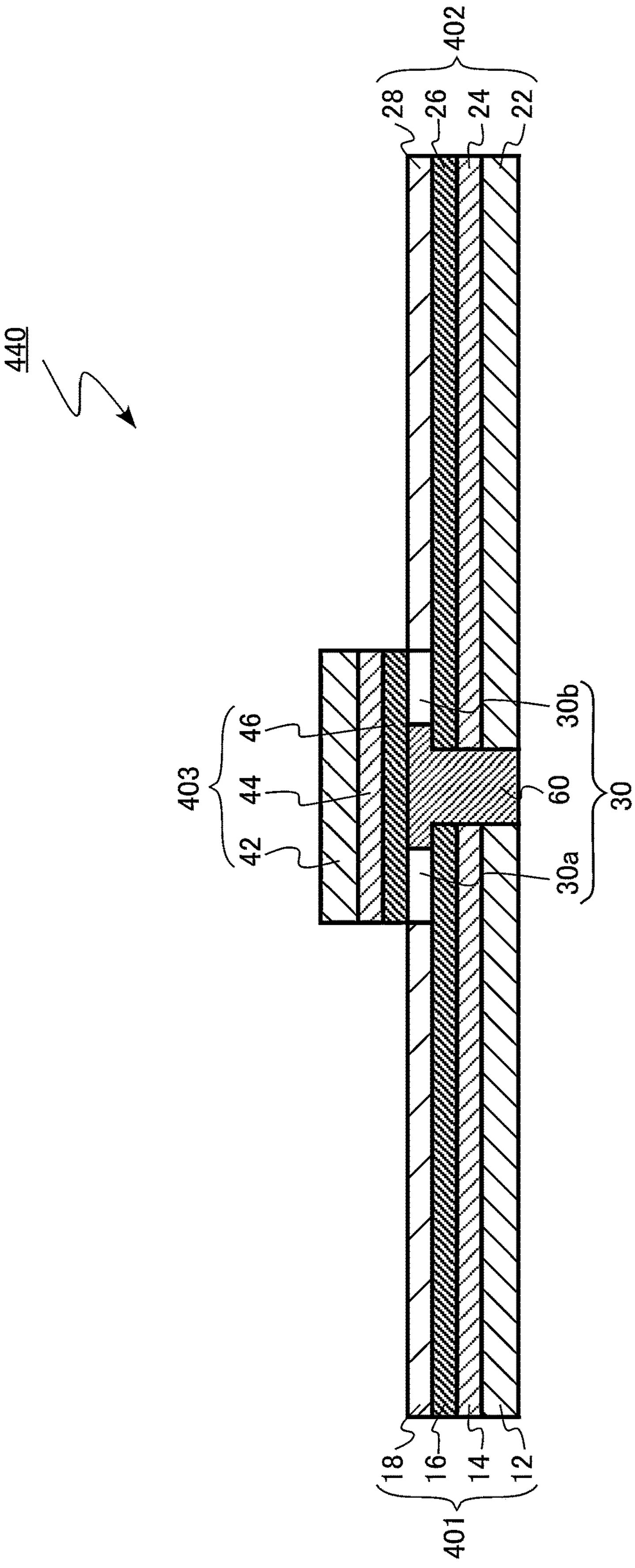
FIG. 13 is a schematic cross-sectional view of a fourth modification of the superconducting wire according to the second embodiment.

FIG. 13 is a schematic cross-sectional view of a fourth modification of the superconducting wire according to the second embodiment. A superconducting wire 440 of the fourth modification of the second embodiment is different from the superconducting wire 430 of the third modification of the second embodiment in including a reinforcing material 60.

The reinforcing material 60 is provided between the first superconducting wire 401 and the second superconducting wire 402. The reinforcing material 60 is provided, for example, between the first superconducting layer 16 and the second superconducting layer 26. The reinforcing material 60 is provided, for example, between the first superconducting layer 16 and the third superconducting layer 46. The reinforcing material 60 is provided, for example, between the second superconducting layer 26 and the third superconducting layer 46. The reinforcing material 60 is provided, for example, between the first connection layer 30*a* and the second connection layer 30*b*.

By providing the reinforcing material 60, the mechanical strength of the superconducting wire 440 is improved.

The reinforcing material 60 is, for example, a metal or resin. The reinforcing material 60 is, for example, a solder. The reinforcing material 60 is, for example, a solder containing silver (Ag) and indium (In).

As described above, according to the second embodiment and the modifications, it is possible to realize a superconducting wire lengthened by connecting the two superconducting wires and having low electrical resistance and high mechanical strength.

Third Embodiment

A superconducting coil according to a third embodiment includes a superconducting wire according to the second embodiment. Hereinafter, description of contents overlapping with those of the second embodiment may be partially omitted.

Figure 14:
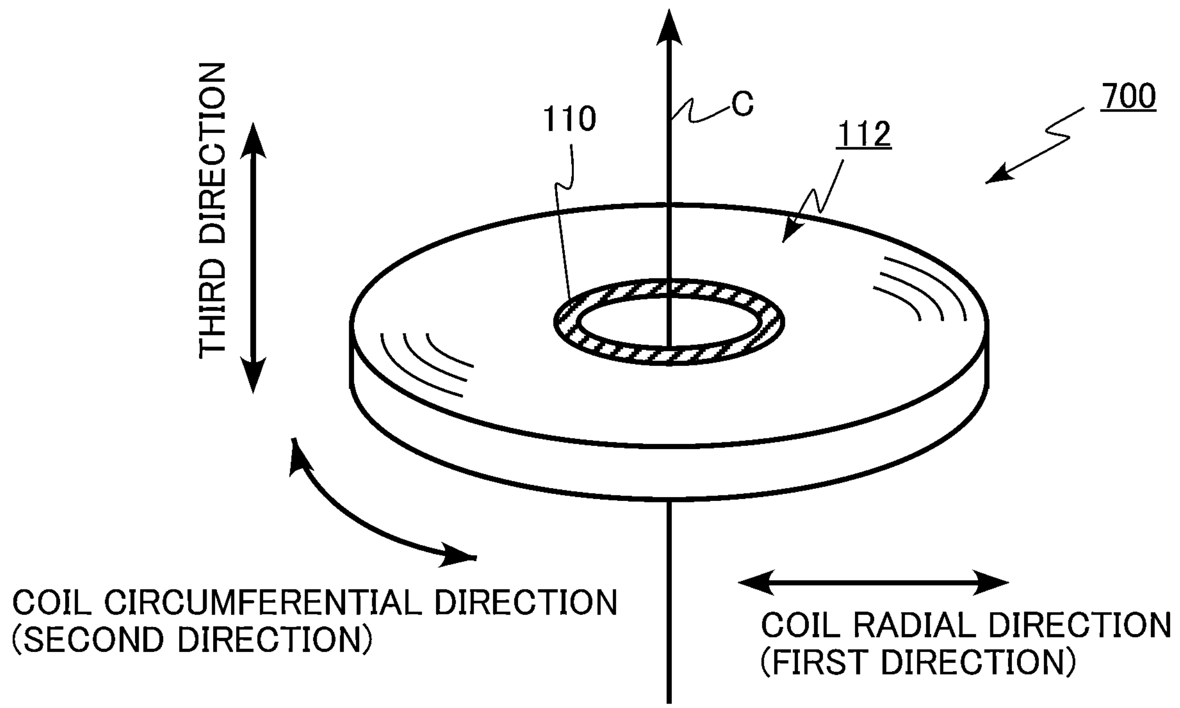
FIG. 14 is a schematic perspective view of a superconducting coil according to a third embodiment.
Figure 15:
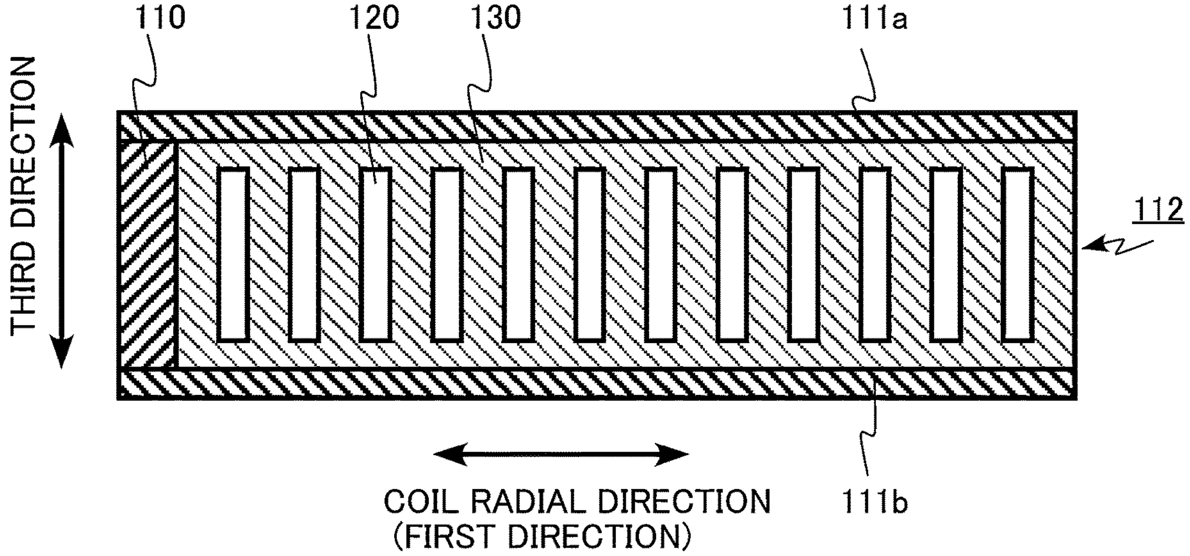
FIG. 15 is a schematic cross-sectional view of the superconducting coil according to the third embodiment.

FIG. 14 is a schematic perspective view of the superconducting coil according to the third embodiment. FIG. 15 is a schematic cross-sectional view of the superconducting coil according to the third embodiment.

A superconducting coil 700 according to the third embodiment is used as a coil for generating a magnetic field of a superconducting device such as NMR, MRI, a heavy particle radiotherapy device, or a superconducting magnetic-levitation railway vehicle.

The superconducting coil 700 includes a winding frame 110, a first insulating plate 111*a*, a second insulating plate 111*b*, and a winding portion 112. The winding portion 112 includes a superconducting wire 120 and a wire material interlayer 130.

FIG. 14 illustrates a state in which the first insulating plate 111*a* and the second insulating plate 111*b* are removed.

The winding frame 110 is made of, for example, fiber-reinforced plastic. The superconducting wire 120 has, for example, a tape shape. As illustrated in FIG. 14, the superconducting wire 120 is wound around the winding frame 110 in a so-called pancake shape of a concentric shape around a winding center axis C.

In FIG. 14, a first direction is a coil radial direction. A second direction is a coil circumferential direction. The first direction is a direction in which the winding center axis C extends.

The wire material interlayer 130 has a function of fixing the superconducting wire 120. The wire material interlayer 130 has a function of suppressing destruction of the superconducting wire 120 due to vibration during use of the superconducting device or friction between the superconducting wire and the superconducting device.

The first insulating plate 111*a* and the second insulating plate 111*b* are made of, for example, fiber-reinforced plastic. The first insulating plate 111*a* and the second insulating plate 111*b* have a function of insulating the winding portion 112 from the outside. The winding portion 112 is located between the first insulating plate 111*a* and the second insulating plate 111*b*.

As the superconducting wire 120, the superconducting wire of the second embodiment is used.

As described above, according to the third embodiment, a superconducting coil with improved characteristics can be realized by including a superconducting wire having low electrical resistance and high mechanical strength.

Fourth Embodiment

A superconducting device according to a fourth embodiment is a superconducting device including a superconducting coil according to the third embodiment. Hereinafter, description of contents overlapping with those of the third embodiment will be partially omitted.

Figure 16:
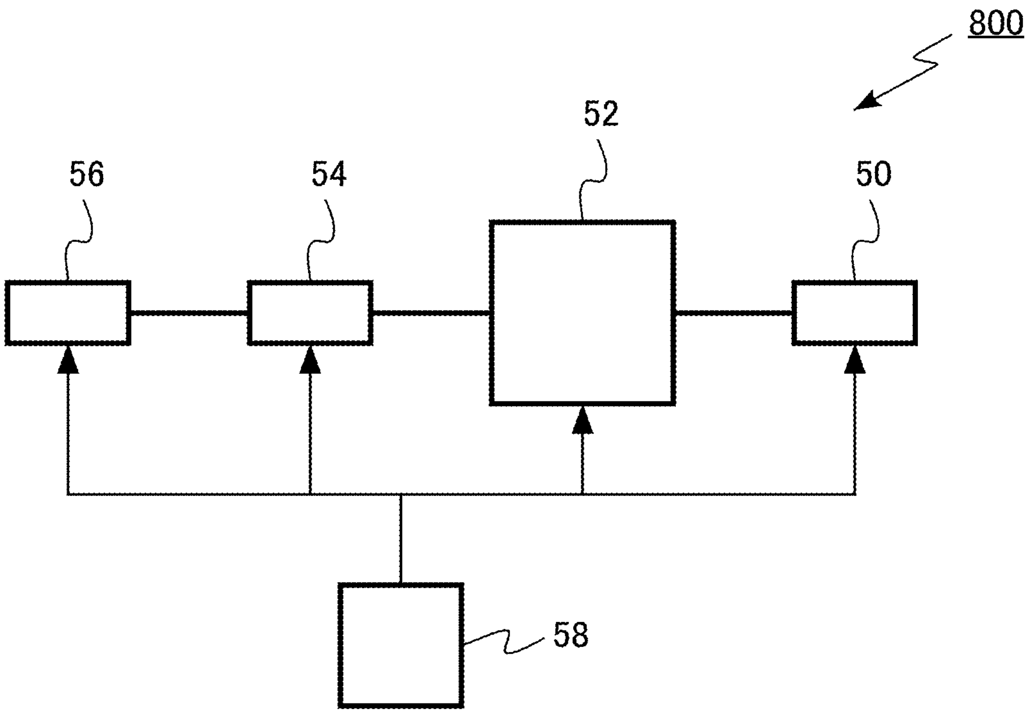
FIG. 16 is a block diagram of a superconducting device according to a fourth embodiment.

FIG. 16 is a block diagram of the superconducting device according to the fourth embodiment. The superconducting device according to the fourth embodiment is a heavy particle radiotherapy device 800. The heavy particle radiotherapy device 800 is an example of the superconducting device.

The heavy particle radiotherapy device 800 includes an incidence system 50, a synchrotron accelerator 52, a beam transport system 54, an irradiation system 56, and a control system 58.

The incidence system 50 has, for example, a function of generating carbon ions to be used for treatment and performing preliminary acceleration for incidence into the synchrotron accelerator 52. The incidence system 50 includes, for example, an ion generation source and a linear accelerator.

The synchrotron accelerator 52 has a function of accelerating a carbon ion beam incident from the incidence system 50 to energy suitable for treatment. A superconducting coil 700 of the third embodiment is used for the synchrotron accelerator 52.

The beam transport system 54 has a function of transporting the carbon ion beam incident from the synchrotron accelerator 52 to the irradiation system 56. The beam transport system 54 includes, for example, a bending electromagnet.

The irradiation system 56 has a function of irradiating a patient to be irradiated with the carbon ion beam incident from the beam transport system 54. The irradiation system 56 has, for example, a rotary gantry that enables irradiation with the carbon ion beam from an arbitrary direction. The superconducting coil 700 of the third embodiment is used for the rotary gantry.

The control system 58 controls the incidence system 50, the synchrotron accelerator 52, the beam transport system 54, and the irradiation system 56. The control system 58 is, for example, a computer.

In the heavy particle radiotherapy device 800 according to the fourth embodiment, the superconducting coil 700 according to the third embodiment is used for the synchrotron accelerator 52 and the rotary gantry. Therefore, the heavy particle radiotherapy device 800 having excellent characteristics is realized.

In the fourth embodiment, the case of the heavy particle radiotherapy device 800 has been described as an example of the superconducting device. However, the superconducting device may be, for example, a nuclear magnetic resonance apparatus (NMR), a magnetic resonance imaging apparatus (MRI), or a superconducting magnetic-levitation railway vehicle.

EXAMPLES

Example 1

Two long oxide superconducting wires having a length of 10 cm and one short oxide superconducting wire having a length of 10 mm were prepared. In each oxide superconducting wire, an intermediate layer and a $GdBa_2Cu_3O_\delta$ layer (oxide superconducting layer) are formed on a Hastelloy base material, and the oxide superconducting layer is covered with a protective layer of silver and copper. A protective layer at a portion of 1.5 cm from ends of the two long superconducting wires and a protective layer over an entire surface of the short superconducting wire were wet-etched using a mixed solution of nitric acid, ammonia, and hydrogen peroxide to expose the oxide superconducting layer.

Powders of $Gd_2O_3$, $BaCO_3$, and CuO were prepared, appropriately weighed, and then sufficiently mixed to produce mixed powders. The mixed powders were heat-treated at 900° C. to obtain a calcined body. The calcined body was pulverized, and the obtained powders were compression-molded to produce a green compact.

The obtained green compact was sintered at 960° C. to produce an oxide superconductor having a composition of $GdBa_2Cu_3O_\delta$ ($6 \leq \delta \leq 7$). The obtained oxide superconductor was wet-pulverized to produce a plurality of crystal particles. The crystal particles were heat-treated at 470° C. in an oxygen atmosphere. After the heat treatment, the crystal particles were selected with a sieve or the like to produce a crystal particle group (superconductor powder) of a superconductor in which a median value of a major axis is 2.1 μm.

The obtained superconductor powder and a solution (organometallic salt solution) containing an organic compound containing the same kind of metal element as that of the superconductor powder as a principal component were mixed to produce a slurry. The superconductor powder and the solution were mixed at a weight ratio of 2:1.

The obtained slurry was applied to the exposed oxide superconducting layer of the short superconducting wire, dried, and then fired at 800° C. Thereafter, the two long superconducting wires were installed side by side with the exposed portions of the superconducting layers facing upward, and the slurry surfaces of the superconducting wires coated with the slurry were superposed on each other while facing each other.

The superposed superconducting wires were sandwiched between metal plates from above and below, and fixed at a pressing value of 70 MPa.

Next, a first heat treatment was performed. In the first heat treatment, the superconducting wire was heated to 820° C. at a low oxygen partial pressure while being sandwiched between the metal plates.

Next, a second heat treatment was performed. In the second heat treatment, oxygen gas was introduced into a furnace, and the superconducting wire was heated to 450° C. in an oxygen atmosphere. A connection structure of the superconducting wire was formed by the second heat treatment.

The characteristics of the obtained connection structure of the superconducting wire were evaluated. For the characteristics, as indices of electrical resistance and mechanical strength, a critical current value Ic at 77 K and a critical current value at 77 K at the time of being curved at R=15 cm were evaluated. Terminals were attached to both ends of the superconducting wire after connection, and a critical current value was measured.

With the critical current value at 77 K of the present connection structure as a reference value of 1.0, a relative critical current value is illustrated in the following Examples and Comparative Examples.

Further, with the critical current value at 77 K when the present connection structure is curved at R=15 cm as a reference value of 1.0, the relative critical current when connection structures of the following Examples and Comparative Examples are similarly curved is illustrated.

The present connection structure was cut in a cross section perpendicular to the surface of the superconducting wire, and SEM observation and STEM observation were performed.

From an SEM image including the entire thickness of the connection layer and the region where the width of the connection layer was 40 μm, the crystal region and the void of the connection layer were distinguished by binarization using image processing software. After calculating each area, the void ratio (void area ratio) was calculated.

For the void, the circle equivalent diameter of the closed void was calculated, and the median value of the circle equivalent diameters of all the voids was calculated.

In the SEM image, a path passing through the crystal region from the upper and lower superconducting layers sandwiching the connection layer and including a plurality of narrow portions was drawn, and a width of a minimum narrow portion having a minimum width among the narrow portions and a length of the path were measured. From the measured length of the path, a ratio of the length of the path to the thickness of the connection layer was calculated.

In the SEM image, five shortest paths that do not intersect each other were drawn. Four SEM images of similar connection layers were prepared, and five shortest paths passing through respective crystal regions were drawn. A minimum width of each narrow portion of the obtained 25 paths was examined, and a ratio of paths in which a width of the minimum narrow portion is equal to or more than 300 nm was calculated.

When the minimum narrow portion was observed by STEM, it was confirmed that each of a first wide portion and a second wide portion existing across the narrow portion had a crystal structure continuous with the narrow portion.

These characteristics and results of image processing are illustrated in Table 1.

Example 2

A connection structure was formed and evaluated similarly to Example 1, except that the first heat treatment temperature was 840° C.

Example 3

A connection structure was formed and evaluated similarly to Example 1, except that superconductor powder having a median value of a major axis of 8.0 μm was produced and a pressing value was 50 MPa.

Example 4

A connection structure was formed and evaluated similarly to Example 1, except that superconductor powder having a median value of a major axis of 5.0 μm was produced and a pressing value was 50 MPa.

Example 5

A connection structure was formed and evaluated similarly to Example 1, except that superconductor powder having a median value of a major axis of 3.5 μm was produced.

Example 6

A connection structure was formed and evaluated similarly to Example 1, except that a pressing value was 100 MPa.

Example 7

A connection structure was formed and evaluated similarly to Example 1, except that superconductor powder having a median value of a major axis of 10 μm was produced and a pressing value was 50 MPa.

Example 8

A connection structure was formed and evaluated similarly to Example 1, except that a pressing value was 60 MPa.

Example 9

A connection structure was formed and evaluated similarly to Example 1, except that superconductor powder having a median value of a major axis of 8.0 μm was produced.

Example 10

A connection structure was formed and evaluated similarly to Example 1, except that superconductor powder having a median value of a major axis of 3.5 μm was produced and a pressing value was 50 MPa.

Example 11

A connection structure was formed and evaluated similarly to Example 1, except that an oxide superconducting wire in which an intermediate layer and a $YBa_2Cu_3O_\delta$ layer were formed on a Hastelloy base material was used, an oxide superconductor having a composition of $YBa_2Cu_3O_\delta$ ($6 \le \delta \le 7$) was produced using $Y_2O_3$ instead of $Gd_2O_3$, and a solution containing an organic compound containing the same kind of metal element as that of the obtained superconductor powder as a principal component was used.

Example 12

A connection structure was formed and evaluated similarly to Example 1, except that an oxide superconducting wire in which an intermediate layer and an $EuBa_2Cu_3O_\delta$ layer were formed on a Hastelloy base material was used, an oxide superconductor having a composition of $EuBa_2Cu_3O_\delta$ ($6 \le \delta \le 7$) was produced using $Eu_2O_3$ instead of $Gd_2O_3$, and a solution containing an organic compound containing the same kind of metal element as that of the obtained superconductor powder as a principal component was used.

Comparative Example 1

A connection structure was formed and evaluated similarly to Example 1, except that superconductor powder having a median value of a major axis of 500 nm was produced. In the present connection structure, a width of a minimum narrow portion was small.

Comparative Example 2

A connection structure was formed and evaluated similarly to Example 1, except that ethanol was used instead of a solution containing an organic compound containing a metal element as a principal component and a first heat treatment temperature was 950° C. In the present connection structure, although there were very few voids and a connection layer was dense, superconducting characteristics of a superconducting layer of a superconducting wire disappeared due to the high heat treatment temperature.

Comparative Example 3

A connection structure was formed and evaluated similarly to Example 1, except that a pressing value was 120 MPa. In the present connection structure, a void ratio of a connection layer was low.

Comparative Example 4

A connection structure was formed and evaluated similarly to Example 1, except that superconductor powder having a median value of a major axis of 5.0 μm was produced and a first heat treatment temperature was 700° C. In the present connection structure, a void ratio of a connection layer was high.

From the above, it has been found that Examples 1 to 12 in which, in the path passing through the crystal region from the upper and lower superconducting layers sandwiching the connection layer and including the narrow portions, the width of the minimum narrow portion having the minimum width among the narrow portions is equal to or more than 300 nm, and the area ratio of the void contained in the connection layer is equal to or more than 30% and equal to or less than 70% had lower electrical resistance and higher mechanical strength than those of Comparative Example 1 in which the width of the minimum narrow portion is less than 300 nm, Comparative Examples 2 and 3 in which the void ratio is lower than 30%, and Comparative Example 4 in which the void ratio is higher than 70%.

Further, in Examples 1 to 5, 11, and 12 in which the median value of the circle equivalent diameter of the void is equal to or more than 200 nm and equal to or less than 10 μm, the ratio of the length of the path with respect to the thickness of the connection layer is equal to or more than 1.2 and equal to or less than 3.0, and the ratio of the paths in which the width of the minimum narrow portion is equal to or more than 300 nm is equal to or more than 80% as described in Table 1, the relative critical current value of 77 K is higher or the relative critical current value of 77 K at the time of curvature is higher, as compared with Examples 6 to 10 deviating from any of the above ranges. Therefore, it was found that Examples 1 to 5, 11, and 12 had lower electrical resistance or higher mechanical strength as compared with Examples 6 to 10.

TABLE 1

| | Minimum narrow portion | Void ratio | Median value of circle equivalent diameter of void | Length of path/thickness of connection layer | Ratio of paths in which width of minimum narrow portion is equal to or more than 300 nm | Ic@77K | Ic@77K at time of curvature |
|---|---|---|---|---|---|---|---|
| Example 1 | 300 nm | 35% | 500 nm | 1.5 | 80% | 1.0 | 1.0 |
| Example 2 | 350 nm | 30% | 200 nm | 2.5 | 80% | 1.1 | 1.0 |
| Example 3 | 3 μm | 70% | 10 μm | 1.3 | 96% | 1.0 | 0.9 |
| Example 4 | 1 μm | 60% | 2 μm | 1.2 | 92% | 1.0 | 0.9 |
| Example 5 | 500 nm | 40% | 400 nm | 3.0 | 84% | 1.0 | 1.1 |
| Example 6 | 300 nm | 30% | 100 nm | 2.5 | 80% | 0.7 | 0.9 |
| Example 7 | 5 μm | 70% | 12 μm | 1.2 | 96% | 0.8 | 0.7 |
| Example 8 | 300 nm | 50% | 300 nm | 3.2 | 80% | 0.9 | 0.7 |
| Example 9 | 3 μm | 50% | 4 μm | 1.1 | 92% | 1.0 | 0.8 |
| Example 10 | 500 nm | 60% | 1 μm | 1.8 | 72% | 0.7 | 0.7 |

TABLE 1-continued

| | Minimum narrow portion | Void ratio | Median value of circle equivalent diameter of void | Length of path/thickness of connection layer | Ratio of paths in which width of minimum narrow portion is equal to or more than 300 nm | Ic@77K | Ic@77K at time of curvature |
|---|---|---|---|---|---|---|---|
| Example 11 | 350 nm | 30% | 400 nm | 1.4 | 80% | 1.0 | 1.1 |
| Example 12 | 300 nm | 40% | 300 nm | 1.6 | 80% | 1.2 | 1.2 |
| Comparative example 1 | 200 nm | 35% | 50 nm | 1.2 | 0% | 0.4 | 0.4 |
| Comparative example 2 | 20 μm | 5% | 50 nm | 1.0 | 100% | 0.0 | 0.0 |
| Comparative example 3 | 300 nm | 25% | 150 nm | 2.0 | 92% | 0.5 | 0.4 |
| Comparative example 4 | 300 nm | 75% | 2 μm | 1.8 | 80% | 0.7 | 0.5 |

While certain embodiments have been described, these embodiments have been presented by way of example only, and are not intended to limit the scope of the inventions. Indeed, the connection structure of the superconducting layer, the superconducting wire, the superconducting coil, and the superconducting device described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

Hereinafter, technical proposals of the present disclosure will be described. The following technical proposals are included in the scope of the present disclosure.

(Technical Proposal 1)

A connection structure of a superconducting layer including:

- a first superconducting layer;
- a second superconducting layer; and
- a connection layer provided between the first superconducting layer and the second superconducting layer and including a crystal region containing a rare earth element (RE), barium (Ba), copper (Cu), and oxygen (O), and a void, wherein
- in a cross section perpendicular to a surface of the first superconducting layer, the crystal region includes a path extending from the first superconducting layer to the second superconducting layer,
- the path includes a plurality of narrow portions, and a width of a minimum narrow portion having a minimum width among the narrow portions is equal to or more than 300 nm, and
- in the cross section, an area ratio of the void is equal to or more than 30% and equal to or less than 70%.

(Technical Proposal 2)

The connection structure of a superconducting layer according to Technical proposal 1, wherein

- the width of the minimum narrow portion is equal to or less than 3 μm.

(Technical Proposal 3)

The connection structure of a superconducting layer according to Technical proposal 1 or 2, wherein

- in the cross section, a median value of a circle equivalent diameter of the void is equal to or more than 200 nm and equal to or less than 10 μm.

(Technical Proposal 4)

The connection structure of a superconducting layer according to any one of Technical proposals 1 to 3, wherein

- a length of the path is larger than a thickness of the connection layer in a first direction from the first superconducting layer toward the second superconducting layer.

(Technical Proposal 5)

The connection structure of a superconducting layer according to any one of Technical proposals 1 to 4, wherein

- the minimum narrow portion is provided between a first wide portion and a second wide portion, and
- the minimum narrow portion includes a first portion having a crystal structure continuous with the first wide portion and a second portion having a crystal structure continuous with the second wide portion.

(Technical Proposal 6)

The connection structure of a superconducting layer according to any one of Technical proposals 1 to 5, wherein

- in a region having a width of 40 μm in a second direction perpendicular to a first direction from the first superconducting layer toward the second superconducting layer in a first cross section perpendicular to the surface of the first superconducting layer, the crystal region includes five first paths extending from the first superconducting layer to the second superconducting layer and including a plurality of narrow portions,
- in a region having a width of 40 μm in the second direction in a second cross section parallel to the first cross section, the crystal region includes five second paths extending from the first superconducting layer to the second superconducting layer and including a plurality of narrow portions,
- in a region having a width of 40 μm in the second direction in a third cross section parallel to the first cross section, the crystal region includes five third paths extending from the first superconducting layer to the second superconducting layer and including a plurality of narrow portions,
- in a region having a width of 40 μm in the second direction in a fourth cross section parallel to the first cross section, the crystal region includes five fourth paths extending from the first superconducting layer to the second superconducting layer and including a plurality of narrow portions,
- in a region having a width of 40 μm in the second direction in a fifth cross section parallel to the first cross section, the crystal region includes five fifth paths extending from the first superconducting layer to the second superconducting layer and including a plurality of narrow portions, and
- a ratio of paths in which a width of a minimum narrow portion having a minimum width among the narrow portions is equal to or more than 300 nm among the five first paths, the five second paths, the five third paths, the five fourth paths, and the five fifth paths is equal to or more than 80%.

(Technical Proposal 7)

A superconducting wire including:

a first superconducting wire including a first superconducting layer;

a second superconducting wire including a second superconducting layer;

a third superconducting layer;

a first connection layer provided between the first superconducting layer and the third superconducting layer and including a crystal region containing a rare earth element (RE), barium (Ba), copper (Cu), and oxygen (O), and a void; and a second connection layer provided between the second superconducting layer and the third superconducting layer and including a crystal region containing a rare earth element (RE), barium (Ba), copper (Cu), and oxygen (O), and a void, wherein in a cross section perpendicular to a surface of the first superconducting layer, the crystal region of the first connection layer includes a path extending from the first superconducting layer to the third superconducting layer, the path includes a plurality of narrow portions, and a width of a minimum narrow portion having a minimum width among the plurality of narrow portions is equal to or more than 300 nm, and in the cross section, an area ratio of the void of the first connection layer is equal to or more than 30% and equal to or less than 70%.

(Technical Proposal 8)

The superconducting wire according to Technical proposal 7, wherein the width of the minimum narrow portion is equal to or less than 3 μm.

(Technical Proposal 9)

The superconducting wire according to Technical proposal 7 or 8, wherein in the cross section, a median value of a circle equivalent diameter of the void of the first connection layer is equal to or more than 200 nm and equal to or less than 10 μm.

(Technical Proposal 10)

The superconducting wire according to any one of Technical proposals 7 to 9, wherein a length of the path is larger than a thickness of the first connection layer in a first direction from the first superconducting layer toward the third superconducting layer.

(Technical Proposal 11)

The superconducting wire according to any one of Technical proposals 7 to 10, wherein the minimum narrow portion is provided between a first wide portion and a second wide portion, and the minimum narrow portion includes a first portion having a crystal structure continuous with the first wide portion and a second portion having a crystal structure continuous with the second wide portion.

(Technical Proposal 12)

The superconducting wire according to any one of Technical proposals 7 to 11, wherein in a region having a width of 40 μm in a second direction perpendicular to a first direction from the first superconducting layer toward the second superconducting layer in a first cross section perpendicular to the surface of the first superconducting layer, the crystal region includes five first paths extending from the first superconducting layer to the third superconducting layer and including a plurality of narrow portions, in a region having a width of 40 μm in the second direction in a second cross section parallel to the first cross section, the crystal region includes five second paths extending from the first superconducting layer to the third superconducting layer and including a plurality of narrow portions, in a region having a width of 40 μm in the second direction in a third cross section parallel to the first cross section, the crystal region includes five third paths extending from the first superconducting layer to the third superconducting layer and including a plurality of narrow portions, in a region having a width of 40 μm in the second direction in a fourth cross section parallel to the first cross section, the crystal region includes five fourth paths extending from the first superconducting layer to the third superconducting layer and including a plurality of narrow portions, in a region having a width of 40 μm in the second direction in a fifth cross section parallel to the first cross section, the crystal region includes five fifth paths extending from the first superconducting layer to the third superconducting layer and including a plurality of narrow portions, and a ratio of paths in which a width of a minimum narrow portion having a minimum width among the narrow portions is equal to or more than 300 nm among the five first paths, the five second paths, the five third paths, the five fourth paths, and the five fifth paths is equal to or more than 80%.

(Technical Proposal 13)

The superconducting wire according to any one of Technical proposals 7 to 12, wherein in a cross section perpendicular to a surface of the second superconducting layer, the crystal region includes a path extending from the second superconducting layer to the third superconducting layer, the path includes a plurality of narrow portions, and a width of a minimum narrow portion having a minimum width among the narrow portions is equal to or more than 300 nm, and in the cross section, an area ratio of the void of the second connection layer is equal to or more than 30% and equal to or less than 70%.

(Technical Proposal 14)

A superconducting coil including the superconducting wire according to any one of Technical proposals 7 to 13.

(Technical Proposal 15)

A superconducting device including the superconducting coil according to Technical proposal 14.

What is claimed is:

1. A connection structure of a superconducting layer comprising:

a first superconducting layer;

a second superconducting layer; and a connection layer provided between the first superconducting layer and the second superconducting layer and including a crystal region containing a rare earth element (RE), barium (Ba), copper (Cu), and oxygen (O), and a void, wherein in a cross section perpendicular to a surface of the first superconducting layer, the crystal region includes a path extending from the first superconducting layer to the second superconducting layer, the path includes a plurality of narrow portions, and a width of a minimum narrow portion having a minimum width among the narrow portions is equal to or more than 300 nm, and in the cross section, an area ratio of the void is equal to or more than 30% and equal to or less than 70%.

2. The connection structure of a superconducting layer according to claim 1, wherein the width of the minimum narrow portion is equal to or less than 3 μm.

3. The connection structure of a superconducting layer according to claim 1, wherein in the cross section, a median value of a circle equivalent diameter of the void is equal to or more than 200 nm and equal to or less than 10 μm.

4. The connection structure of a superconducting layer according to claim 1, wherein a length of the path is larger than a thickness of the connection layer in a first direction from the first superconducting layer toward the second superconducting layer.

5. The connection structure of a superconducting layer according to claim 1, wherein the minimum narrow portion is provided between a first wide portion and a second wide portion, and the minimum narrow portion includes a first portion having a crystal structure continuous with the first wide portion and a second portion having a crystal structure continuous with the second wide portion.

6. The connection structure of a superconducting layer according to claim 1, wherein in a region having a width of 40 μm in a second direction perpendicular to a first direction from the first superconducting layer toward the second superconducting layer in a first cross section perpendicular to the surface of the first superconducting layer, the crystal region includes five first paths extending from the first superconducting layer to the second superconducting layer and including a plurality of narrow portions, in a region having a width of 40 μm in the second direction in a second cross section parallel to the first cross section, the crystal region includes five second paths extending from the first superconducting layer to the second superconducting layer and including a plurality of narrow portions, in a region having a width of 40 μm in the second direction in a third cross section parallel to the first cross section, the crystal region includes five third paths extending from the first superconducting layer to the second superconducting layer and including a plurality of narrow portions, in a region having a width of 40 μm in the second direction in a fourth cross section parallel to the first cross section, the crystal region includes five fourth paths extending from the first superconducting layer to the second superconducting layer and including a plurality of narrow portions, in a region having a width of 40 μm in the second direction in a fifth cross section parallel to the first cross section, the crystal region includes five fifth paths extending from the first superconducting layer to the second superconducting layer and including a plurality of narrow portions, and a ratio of paths in which a width of a minimum narrow portion having a minimum width among the narrow portions is equal to or more than 300 nm among the five first paths, the five second paths, the five third paths, the five fourth paths, and the five fifth paths is equal to or more than 80%.

7. A superconducting wire comprising:

a first superconducting wire including a first superconducting layer;

a second superconducting wire including a second superconducting layer;

a third superconducting layer;

a first connection layer provided between the first superconducting layer and the third superconducting layer and including a crystal region containing a rare earth element (RE), barium (Ba), copper (Cu), and oxygen (O), and a void; and a second connection layer provided between the second superconducting layer and the third superconducting layer and including a crystal region containing a rare earth element (RE), barium (Ba), copper (Cu), and oxygen (O), and a void, wherein in a cross section perpendicular to a surface of the first superconducting layer, the crystal region of the first connection layer includes a path extending from the first superconducting layer to the third superconducting layer, the path includes a plurality of narrow portions, and a width of a minimum narrow portion having a minimum width among the plurality of narrow portions is equal to or more than 300 nm, and in the cross section, an area ratio of the void of the first connection layer is equal to or more than 30% and equal to or less than 70%.

8. The superconducting wire according to claim 7, wherein the width of the minimum narrow portion is equal to or less than 3 μm.

9. The superconducting wire according to claim 7, wherein in the cross section, a median value of a circle equivalent diameter of the void of the first connection layer is equal to or more than 200 nm and equal to or less than 10 μm.

10. The superconducting wire according to claim 7, wherein a length of the path is larger than a thickness of the first connection layer in a first direction from the first superconducting layer toward the third superconducting layer.

11. The superconducting wire according to claim 7, wherein the minimum narrow portion is provided between a first wide portion and a second wide portion, and the minimum narrow portion includes a first portion having a crystal structure continuous with the first wide portion and a second portion having a crystal structure continuous with the second wide portion.

12. The superconducting wire according to claim 7, wherein in a region having a width of 40 μm in a second direction perpendicular to a first direction from the first superconducting layer toward the second superconducting layer in a first cross section perpendicular to the surface of the first superconducting layer, the crystal region includes five first paths extending from the first superconducting layer to the third superconducting layer and including a plurality of narrow portions, in a region having a width of 40 μm in the second direction in a second cross section parallel to the first cross section, the crystal region includes five second paths extending from the first superconducting layer to the third superconducting layer and including a plurality of narrow portions, in a region having a width of 40 μm in the second direction in a third cross section parallel to the first cross section, the crystal region includes five third paths extending from the first superconducting layer to the third superconducting layer and including a plurality of narrow portions, in a region having a width of 40 μm in the second direction in a fourth cross section parallel to the first cross section, the crystal region includes five fourth paths extending from the first superconducting layer to the third superconducting layer and including a plurality of narrow portions, in a region having a width of 40 μm in the second direction in a fifth cross section parallel to the first cross section, the crystal region includes five fifth paths extending from the first superconducting layer to the third superconducting layer and including a plurality of narrow portions, and a ratio of paths in which a width of a minimum narrow portion having a minimum width among the narrow portions is equal to or more than 300 nm among the five first paths, the five second paths, the five third paths, the five fourth paths, and the five fifth paths is equal to or more than 80%.

13. The superconducting wire according to claim 7, wherein in a cross section perpendicular to a surface of the second superconducting layer, the crystal region includes a path extending from the second superconducting layer to the third superconducting layer, the path includes a plurality of narrow portions, and a width of a minimum narrow portion having a minimum width among the narrow portions is equal to or more than 300 nm, and in the cross section, an area ratio of the void of the second connection layer is equal to or more than 30% and equal to or less than 70%.

14. A superconducting coil comprising the superconducting wire according to claim 7.

15. A superconducting device comprising the superconducting coil according to claim 14.

* * * * *